United States Patent
Haneda et al.

(10) Patent No.: US 7,959,492 B2
(45) Date of Patent: Jun. 14, 2011

(54) DISK-SHAPED SUBSTRATE INNER CIRCUMFERENCE POLISHING METHOD

(75) Inventors: Kazuyuki Haneda, Ichihara (JP); Kunizo Watanabe, Minamitsuru-gun (JP); Yosuke Sato, Minamitsuru-gun (JP)

(73) Assignees: Showa Denko K.K., Tokyo (JP); Citizen Seimitsu Co., Ltd., Yamanashi (JP)

( * ) Notice: Subject to any disclaimer, the term of this patent is extended or adjusted under 35 U.S.C. 154(b) by 8 days.

(21) Appl. No.: 11/898,273

(22) Filed: Sep. 11, 2007

(65) Prior Publication Data

US 2008/0176489 A1   Jul. 24, 2008

(30) Foreign Application Priority Data

Sep. 11, 2006 (JP) ................. 2006-246122
Sep. 25, 2006 (JP) ................. 2006-259747
Oct. 6, 2006 (JP) ................. 2006-275745
Oct. 6, 2006 (JP) ................. 2006-275815
Oct. 27, 2006 (JP) ................. 2006-292553
Oct. 27, 2006 (JP) ................. 2006-292585
Oct. 31, 2006 (JP) ................. 2006-296112

(51) Int. Cl.
   *B24B 1/00* (2006.01)
(52) U.S. Cl. ............... 451/36; 451/41; 451/44; 451/61; 451/59
(58) Field of Classification Search ............. 451/35, 451/36, 41, 44, 59, 61, 54, 120, 121, 124, 451/180, 231, 242, 246
   See application file for complete search history.

(56) References Cited

U.S. PATENT DOCUMENTS

| 4,831,783 | A | 5/1989 | Frohn |
| 6,280,294 | B1 | 8/2001 | Miyamoto |
| 6,615,613 | B1 | 9/2003 | Iwabuchi et al. |
| 6,827,631 | B2 | 12/2004 | Tomotaki et al. |
| 7,175,511 | B2 * | 2/2007 | Ueda et al. ............ 451/63 |
| 2003/0205060 | A1 | 11/2003 | Iwabuchi et al. |
| 2003/0232584 | A1 | 12/2003 | Tomotaki et al. |
| 2004/0229003 | A1 | 11/2004 | Iwabuchi et al. |
| 2007/0249267 | A1 * | 10/2007 | Aida et al. ............ 451/41 |
| 2007/0254561 | A1 | 11/2007 | Aida et al. |

FOREIGN PATENT DOCUMENTS

| JP | 63-180454 A | 7/1988 |
| JP | 03019757 * | 1/1991 |
| JP | 5-177527 A | 7/1993 |
| JP | 05-261652 A | 10/1993 |
| JP | 11-033886 A | 2/1999 |
| JP | 11-221742 A | 8/1999 |
| JP | 11-239957 A | 9/1999 |
| JP | 2000-42893 A | 2/2000 |
| JP | 2000-84828 A | 3/2000 |

(Continued)

*Primary Examiner* — Eileen P. Morgan
(74) *Attorney, Agent, or Firm* — Sughrue Mion, PLLC

(57) ABSTRACT

The disk-shaped substrate inner circumference polishing method for polishing an inner circumference of a disk-shaped substrate including a portion having an opening hole at the center thereof includes inserting a brush having a shaft core into the portion having the opening hole of the disk-shaped substrate; fixing one end and the other end of the brush to a pair of rotating shafts that are provided at mutually detached positions and pulling at least any one of the one end and the other end of the brush and applying tension in the axial direction to the shaft core of the brush; and rotating the brush and polishing the inner circumference of the disk-shaped substrate.

6 Claims, 12 Drawing Sheets

FOREIGN PATENT DOCUMENTS

| | | | |
|---|---|---|---|
| JP | 2000-127005 A | | 5/2000 |
| JP | 2000185927 A | * | 7/2000 |
| JP | 2001-162510 A | | 6/2001 |
| JP | 2002-137157 A | | 5/2002 |
| JP | 2002-361543 A | | 12/2002 |
| JP | 2003-245855 A | | 9/2003 |
| JP | 2004-342307 | * | 2/2004 |
| JP | 2004-342307 A | | 12/2004 |
| JP | 2005-22047 A | | 1/2005 |
| JP | 3108405 U | | 2/2005 |
| JP | 2006-000674 A | | 1/2006 |
| JP | 2006-7350 A | | 1/2006 |
| JP | 2006-15450 A | | 1/2006 |
| JP | 2006-43842 A | | 2/2006 |
| JP | 2006-88321 A | | 4/2006 |
| JP | 2006-192539 A | | 7/2006 |
| JP | 2006-236561 A | | 9/2006 |
| WO | 2005/009681 A1 | | 2/2005 |
| WO | WO2007/037302 | * | 9/2006 |

* cited by examiner

FIRST LAPPING PROCESS

INNER AND OUTER CIRCUMFERENCE GRINDING PROCESS

OUTER CIRCUMFERENCE POLISHING PROCESS

SECOND LAPPING PROCESS

INNER CIRCUMFERENCE
POLISHING PROCESS

FIRST POLISHING PROCESS

SECOND POLISHING PROCESS

FINAL WASHING AND INSPECTION PROCESS

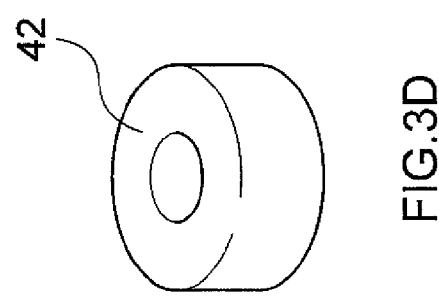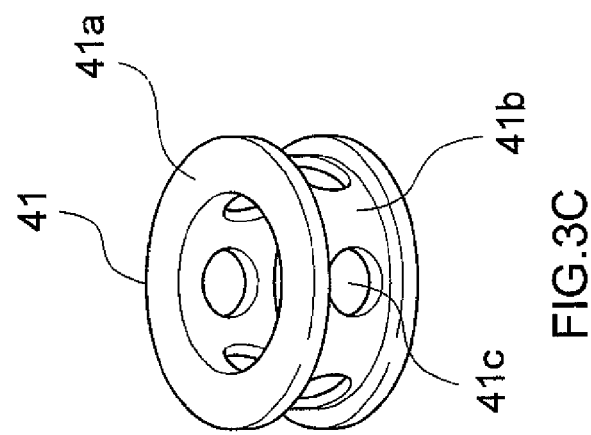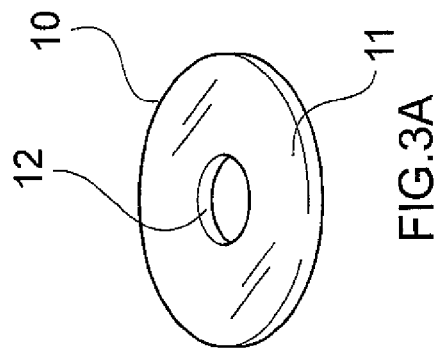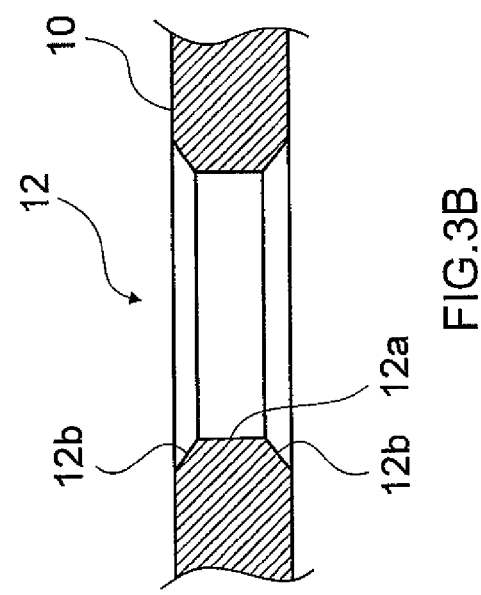

DISK-SHAPED SUBSTRATE INNER CIRCUMFERENCE POLISHING METHOD

CROSS REFERENCE TO RELATED APPLICATIONS

This application is based on and claims priority under 35 USC §119 from Japanese Patent Application No. 2006-246122 filed Sep. 11, 2006, No. 2006-259747 filed Sep. 25, 2006, No. 2006-275745 filed Oct. 6, 2006, No. 2006-275815 filed Oct. 6, 2006, No. 2006-292553 filed Oct. 27, 2006, No. 2006-292585 filed Oct. 27, 2006, and No. 2006-296112 filed Oct. 31, 2006.

BACKGROUND

1. Technical Field

The present invention relates to an inner circumference polishing method of disk-shaped substrate such as a glass substrate for magnetic recording medium or the like.

2. Related Art

In recent years, the production of disk substrates as disk-shaped substrates has been activated, under increased demands as recording media. As a magnetic disk substrate as one of the disk substrates, an aluminum substrate and a glass substrate are used widely. The aluminum substrate is characterized by its high processability and low cost, meanwhile the glass substrate is characterized by its excellent strength, surface smoothness, and flatness. In particular, requirements for compact size and high density of disk substrates recently have become extremely high, and the glass substrate of which surface roughness is small and that enables high density has attracted a lot of attention.

Various improvements have been made in methods of manufacturing such magnetic disk substrates. As the related art described in official gazettes, there is an art of polishing the inner circumferential surface of a glass disk including a portion having a hole at the center (for example, refer to Japanese Unexamined Patent Application Publication No. 11-33886, and No. 11-221742).

In the Japanese Unexamined Patent Application Publication No. 11-33886, piled glass disks are set rotatably around the central axis, and a shaft mounted polishing brush having numerous brush bristles around its axis is inserted into the portions having a hole at the center of the piled glass disks. Thereafter, this shaft mounted polishing brush is reciprocated, while the shaft is rotated in the reverse direction to the rotation direction of the piled glass disk, and thereby the inner circumferential surfaces of the piled glass disks are polished.

Further, in the Japanese Unexamined Patent Application Publication No. 11-221742, a polishing method is proposed where glass substrates are soaked in polishing liquid including separate abrasive, and thereby insufficient polishing and polishing failure due to liquid shortage are prevented. Furthermore, in the Japanese Unexamined Patent Application Publication No. 11-221742, an art is disclosed where brush bristles implanted spirally on rotation axis are rotated to polish the surfaces, and fresh polishing liquid is always circulated and supplied to the surfaces to be polished, and thereby polishing efficiency, reproducibility and precision are increased.

FIGS. 10A and 10B are diagrams for explaining a method of polishing the inner circumference of disk-shaped substrates according to the related art (including the methods of the Japanese Unexamined Patent Application Publication No. 11-33886, and No. 11-221742). In FIGS. 10A and 10B, a brush shaft is inserted into portions having a hole at the center of piled disk-shaped substrates (piled workpieces), and a driving source is placed in the upper direction of the brush shaft (upper shaft direction) so as to rotate the brush shaft. Herein, FIG. 10A shows an inner circumference polishing method where there is no support at the lower shaft of the brush shaft, and the brush shaft rotates in the state where the lower shaft is free. Meanwhile, FIG. 10B shows an inner circumference polishing method where the brush shaft rotates in the state where a support such as a bearing or the like is provided at the lower shaft of the brush shaft.

In this conventional method, in the case of one side support as shown in FIG. 10A, as shown in the right figure of FIG. 10A, the other side that is not supported (non fixed side) swings largely, and the inner diameters of disks at the one side to which the brush swings largely are scraped largely. Further, with the support of the lower shaft as shown in FIG. 10B, the shaft deviates from the support portion of the lower shaft (for example, a lift), and as shown in the right figure of FIG. 10B, the swing of the central portion becomes large, and the inner diameters of disks at the central portion are scraped largely. In particular, when the brush is rotated at a high speed, these swing phenomena become conspicuous. Further, as diameters of disks become small, the diameters of inner circumferential surfaces to be processed become small. Accordingly, when the decrease in the diameter of the shaft is required, the rigidity of the brush shaft becomes low, and the swing at one side (non fixed side) as shown in the right figure of FIG. 10A and the swing at the central portion as shown in the right figure of FIG. 10B become large. As a result, preferable inner circumference polishing cannot be attained.

Meanwhile, there are other related arts with regard to the solution of these problems (for example, refer to Japanese Unexamined Patent Application Publication No. 2000-84828, and No. 2006-7350).

In the Japanese Unexamined Patent Application Publication No. 2000-84828, one end of shaft mounted polishing brush is fixed with a motor, and the shaft end as the other end is supported rotatably by a portion having a hole for supporting a brash shaft. In this supported state, the shaft mounted polishing brush moves up and down together with the portion having the hole for supporting the brush shaft so that the rotation supporting state is continued, while the brush shaft mounted polishing brush reciprocates. Thereby, the swing of shaft end as the other end of the shaft that is not motor fixing side of brush is prevented.

Further, in the Japanese Unexamined Patent Application Publication No. 2006-7350, shaft mounted polishing brush is inserted into portions having a hole at the center of piled glass disks, and is rotated and reciprocated in the state where a load is applied downward to the shaft so as to polish inner circumferential surfaces. It is described that thereby, downward tension is applied to the shaft, and even when the shaft is thin, it is possible to polish respective portions at top, center, bottom of piled glass disks evenly because deflection and a small swing can be prevented.

Furthermore, other polishing method improving these related arts is proposed (for example, refer to Japanese Unexamined Patent Application Publication No. 2006-15450). In the Japanese Unexamined Patent Application Publication No. 2006-15450, there is provided a cylindrical supporting jig that contains and holds plural magnetic disk substrates as objectives of polishing in concentrically piled state. This supporting jig is held rotatably around the shaft via housing. Further, this housing reciprocates in the axial direction of the supporting jig.

Herein, in the structure where tension is simply applied to the other end of shaft and only one end is rotated and driven as mentioned above, for example, distortion phenomenon of shaft increases, and it is difficult to process the inner circumferential surface evenly. In particular, when the shaft core of brush shaft is made flexible, or when it is necessary to make the brush shaft thin for polishing a portion having a small opening hole, for example, in the case where the shaft core of brush is processed by twisting wire and arranging bristle heads spirally, even in the case when tension is applied to the other end, the brush property at polishing process becomes unstable by rotation driving by only one end.

Further, for example, in the case when the piled substrates (the piled workpieces) are arranged vertically, the swing of the piled workpieces becomes large, and it is difficult to polish the portions of the axial direction of the piled workpieces evenly. Furthermore, even in the case when the piled workpieces are arranged horizontally, it is difficult to perform positioning and centering preferably, by only supporting both ends of holder (supporting jig). In particular, when it is necessary to frequently insert and detach the holder, if the holder attachment method is complicated, it takes time and labor for centering and fixation, and much time is required for manufacturing process. Moreover, it is difficult to supply polishing liquid (slurry) to the inner circumferential surfaces of piled workpieces by simply arranging them horizontally, and polishing becomes unstable in some flow states of the polishing liquid. At this moment, for supplying polishing liquid forcibly, for example, pneumatic transportation by a pump is required. In such a case, the size of the apparatus becomes large and mechanism thereof becomes complicated. Further, even with such a supply mechanism, it is not possible to supply polishing liquid uniformly to the entire portions having an opening hole of the piled workpieces, by supplying polishing liquid from only one end of the piled workpieces. As a result, uneven polishing is likely to occur in the portions of the piled direction of piled workpieces.

Herein, in order to sufficiently supply polishing liquid (slurry) to the inner circumferential surfaces of piled workpieces, it is effective to soak the entire substrate holder that holds piled substrates into polishing liquid (slurry), and to apply a sufficient amount of polishing liquid (slurry) onto the entire substrate holder. However, by these methods of the supply of polishing liquid (slurry), polishing liquid (slurry) gets also into a bearing and the like used as brush rotation mechanisms or the like. As a result, it leads to shortened life of the apparatus.

Further, for example, when it is desired to make the inner circumference polishing in the piled workpieces more even, it is effective to restrain uneven polishing by changing polishing conditions, such as changing the relative positions between the polishing brush and the substrate holder and the like. In this case, it is very effective, for example, to invert the piled workpieces in the axial direction. However, in the related art, it is not easy to invert the piled workpieces. As a result, in the related art, there is no choice but to realize preferable polishing with enormous number of man-hour, or to give up adoption of preferable polishing work.

A main object of the present invention is to polish the portion having the opening hole at the center of a disk-shaped substrate in an extremely precise manner.

Another object of the present invention is to precisely polish the portion having the opening hole at the center of the disk-shaped substrate evenly by a simple method.

Further object of the present invention is to provide a method of polishing inner circumference of a disk-shaped substrate for preferably supplying polishing liquid (slurry) to the portion having the opening hole at the center of the disk-shaped substrate, and attaining preferable life of a polishing apparatus.

Furthermore object of the present invention is to restrain the occurrence of a rotation swing of a polishing brush.

Furthermore object of the present invention is to prevent polishing liquid from flowing into, for example, a mechanical portion provided at an end, and to restrain abrasion of a bearing by polishing agent.

Furthermore object of the present invention is to realize further preferable inner circumference polishing of a disk-shaped substrate, for example, even in the case where a polishing brush with a thin shaft easily to bend is used.

SUMMARY

According to an aspect of the invention, there is provided a disk-shaped substrate inner circumference polishing method for polishing an inner circumference of a disk-shaped substrate including a portion having an opening hole at the center thereof, including inserting a brush having a shaft core into the portion having the opening hole of the disk-shaped substrate; fixing one end and the other end of the brush to a pair of rotating shafts that are provided at mutually detached positions and pulling at least any one of the one end and the other end of the brush and applying tension in an axial direction to the shaft core of the brush; and rotating the brush and polishing the inner circumference of the disk-shaped substrate.

Herein, the brush inserted into the portion having the opening hole has bristles that are arranged spirally, and the shaft core of the brush has flexibility.

Further, the pair of rotating shafts is rotated synchronously by any one of a mechanical connection of the pair of rotating shafts with a single motor, and controlling individual motors provided to each pair of rotating shafts.

Furthermore, the brush is pulled out from the disk-shaped substrate; a second brush of which bristles are shorter and harder than the bristles of the brush is inserted into the portion having the opening hole of the disk-shaped substrate; one end and the other end of the second brush is fixed to the pair of rotating shafts, at least any one of the one end and the other end of the second brush is pulled, and tension is applied in the axial direction to a shaft core of the second brush; and at least any one of the second brush and the disk-shaped substrate is rotated, and the inner circumference of the disk-shaped substrate is polished.

Furthermore, the shaft core of the brush and the second brush is formed by twisting wires.

Furthermore, plural disk-shaped substrates are attached to a substrate holder to which the plural disk-shaped substrates are attached in the axial direction; a brush is inserted into the portions having the opening hole of the disk-shaped substrates attached to the substrate holder; the one end and the other end of the brush is fixed to a pair of rotating shafts that are provided at mutually detached positions in a horizontal direction, and a part of the disk-shaped substrates attached to the substrate holder is soaked into polishing liquid and the inner circumference of the disk-shaped substrates is polished.

Furthermore, the pair of rotating shafts to which the brush is fixed is provided in a position away from a liquid bath for soaking the part of the substrate holder into polishing liquid.

In another aspect of the invention, there is provided a disk-shaped substrate inner circumference polishing method for polishing an inner circumference of a disk-shaped substrate having a portion having an opening hole at the center thereof, including attaching plural disk-shaped substrates to a substrate holder that is provided with an attachment portion to which the plural disk-shaped substrates are attached in an axial direction and a gear that is provided in an outer circumferential portion of the substrate holder; inserting a brush into the portions having the opening hole of the disk-shaped substrates attached to the substrate holder; engaging a drive side gear to the gear that is provided in the substrate holder; and rotating the substrate holder via the gear by a rotary driving of the drive side gear.

Further, the substrate holder includes a portion having a polishing liquid flow-in opening, the disk-shaped substrate inner circumference polishing method includes supplying polishing liquid to the portion having the polishing liquid flow-in opening by the rotation, rotating the brush, and rotating the substrate holder in a reverse direction to the rotation direction of the brush, and reciprocating the substrate holder in the axial direction of the brush.

Furthermore, the engagement determines engaging relation between the gear and the drive side gear, by keeping contact ring members provided on the outer circumferential portion of the substrate holder in contact with ring members attached to a rotating shaft on which the drive side gear is provided.

Furthermore, the plural disk-shape substrates are attached to be piled to a jig by inserting the jig to the portion having the opening hole at the center of the disk-shaped substrate, further attaching a guide spacer that is equipped with a portion having an opening hole at the center and an interconnecting portion which interconnects the portion having the opening hole and the outer circumferential portion, between the plural piled disk-shaped substrates; and the plural disk-shaped substrates is attached to the substrate holder by inserting the plural disk-shaped substrates from the attachment portion, the plural piled disk-shaped substrates are pressed in the axial direction to attach to the substrates holder, the jig from the substrates holder is removed, and the brush is inserted into the portion having the opening hole in the state where the jig is removed.

In further aspect of the invention, there is provided a disk-shaped substrate inner circumference polishing method for polishing an inner circumference of a disk-shaped substrate including a portion having an opening hole at the center thereof, including attaching plural disk-shaped substrates to a substrate holder that is equipped with an attachment portion to which the plural disk-shaped substrates are attached along an axial direction and a first gear and a second gear provided at positions that are mutually symmetrical to the axial direction of the substrate holder and provided in an outer circumferential portion of the substrate holder; inserting a brush into the portion having the opening hole of the disk-shaped substrates attached to the substrate holder; engaging a drive side gear with the first gear provided on the substrate holder; rotating the drive side gear and polishing the portion having the opening hole; stopping the drive side gear, inverting both ends of the substrate holder in the axial direction and engaging the drive side gear with the second gear; and rotating the drive side gear and polishing the portion having the opening hole.

Herein, the substrate holder is held in a horizontal state; a part of the disk-shaped substrates is soaked in polishing liquid; and the inner circumference of the disk-shaped substrates is polished.

During polishing, polishing liquid is made to flow into the portion having the opening hole of the disk-shaped substrates by rotating the brush.

The brush is rotated, and thereby polishing liquid is made to flow into the portion having the opening hole of the disk-shaped substrates from an end of the substrate holder.

Large diameter portions are provided on a shaft core of the brush where the bristle is not provided, and by the large diameter portions, the flow of polishing liquid to each end of the shaft core of the brush is prevented.

The substrate holder is rotated, thereby via an interconnecting portion of a guide spacer that is held between the plural disk-shaped substrates attached to the substrate holder and that is equipped with a portion having an opening hole at the center and the interconnecting portion which interconnects the portion having the opening hole and the outer circumferential portion, polishing liquid is made to flow into the portion having the opening hole of the disk-shaped substrate and the inner circumference of the disk-shaped substrate is polished.

The substrate holder includes a portion having a polishing liquid flow-in opening that interconnects the attachment portion to which the piled disk-shaped substrates are attached and the outer circumference of the substrate holder, and the substrate holder is rotated, thereby polishing liquid is made to flow into the portion having the opening hole of the disk-shaped substrate via the portion having the polishing liquid flow-in opening and the interconnecting portion of the guide spacer.

The substrate holder has a vane that is provided in a vicinity of the portion having the polishing liquid flow-in opening and on a surface of the outer circumference of the substrate holder and that guides polishing liquid to the portion having the polishing liquid flow-in opening, and the substrate holder is rotated, thereby polishing liquid is made to flow into the portion having the opening hole of the disk-shaped substrate via the portion having the polishing liquid flow-in opening and the interconnecting portion of the guide spacer.

BRIEF DESCRIPTION OF THE DRAWINGS

Exemplary embodiment(s) of the present invention will be described in detail based on the following figures, wherein:

FIG. 3A is a perspective view of the disk-shaped substrate as a workpiece;

FIG. 3B is a partial cross sectional view of the portion having the opening hole at the center of the disk-shaped substrate;

FIG. 3C is a diagram illustrating a polishing liquid guide spacer;

FIG. 3D is a diagram illustrating a both-ends spacer;

DETAILED DESCRIPTION

Figure 1A:
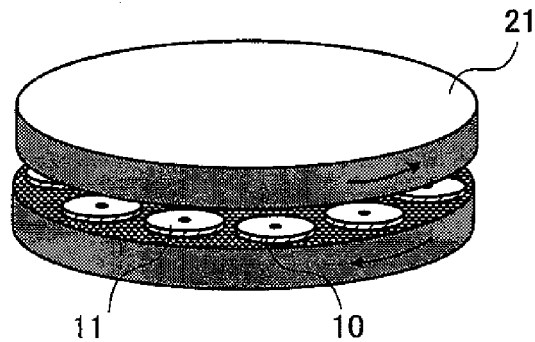
FIGS. 1A to 1H are diagrams illustrating the manufacturing process of a disk-shaped substrate (a disk substrate) to which the exemplary embodiments according to the present invention are applied.
Figure 1B:
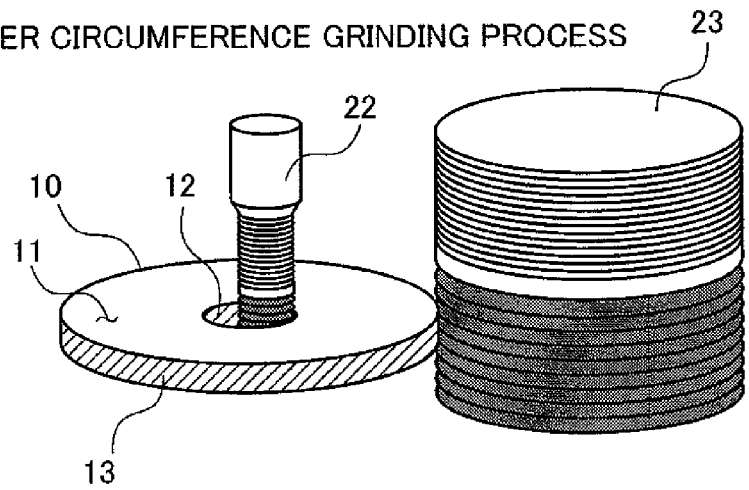
Figure 1C:
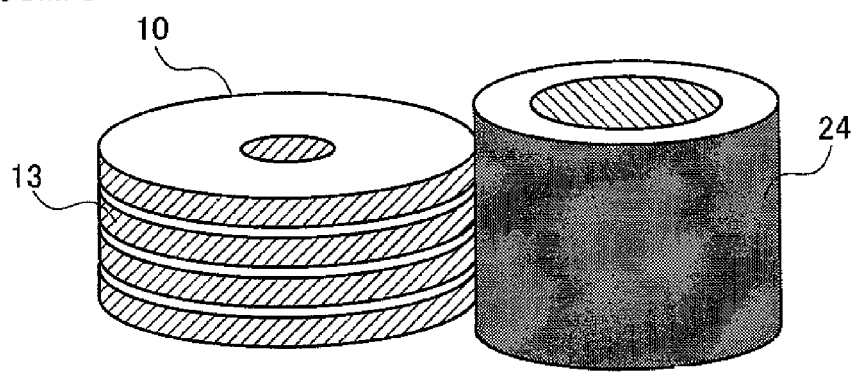
Figure 1D:
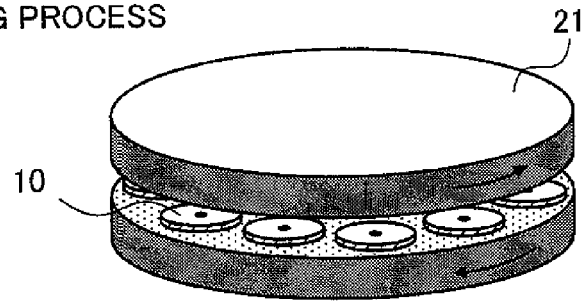

Hereinafter, exemplary embodiments of the present invention will be described in detail with reference to the attached drawings.

FIG. 1A to FIG. 1H are diagrams illustrating the manufacturing process of a disk-shaped substrate (a disk substrate) to which the exemplary embodiments according to the present invention are applied. In this manufacturing process, first, in a first lapping process shown in FIG. 1A, raw materials of disk-shaped substrates (workpieces) 10 are put on a fixed base 21, and flat surfaces 11 of the disk-shaped substrates 10 are ground. At this moment, on the surface of the fixed base 21 on which the disk-shaped substrates 10 are put, for example, abrasives of diamond are dispersed and spread. Next, in an inner and outer circumference polishing process shown in FIG. 1B, a portion having an opening hole 12 formed at the center of the disk-shaped substrate 10 is ground by an inner circumference grind stone 22, and the outer circumference 13 of the disk-shaped substrate 10 is ground by an outer circumference grind stone 23. At this moment, the inner circumferential surface and the outer circumferential surface of the disk-shaped substrate 10 are held and processed at the same time by the inner circumference grind stone 22 and the outer circumference grind stone 23, and thereby coaxial degrees of the inner diameter and the outer diameter are easily secured. Further, in an outer circumference polishing process shown in FIG. 1C, the outer circumferences 13 of the disk-shaped substrates 10 are polished by use of an outer circumference polishing brush 24. Thereafter, in a second lapping process shown in FIG. 1D, the disk-shaped substrates 10 are mounted on the fixed base 21, and the flat surfaces 11 of the disk-shaped substrates 10 are further ground.

Figure 1E:
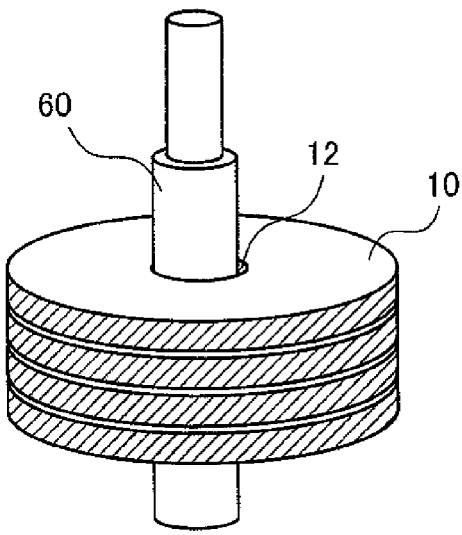
Figure 1F:
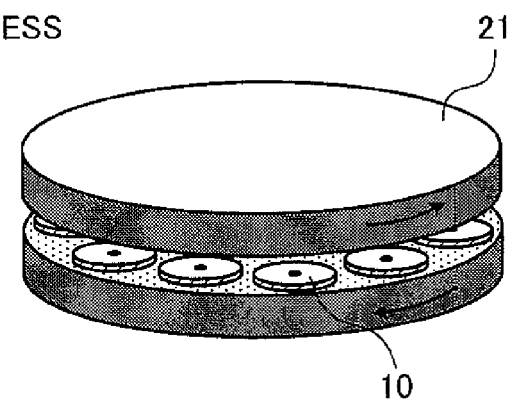
Figure 1G:
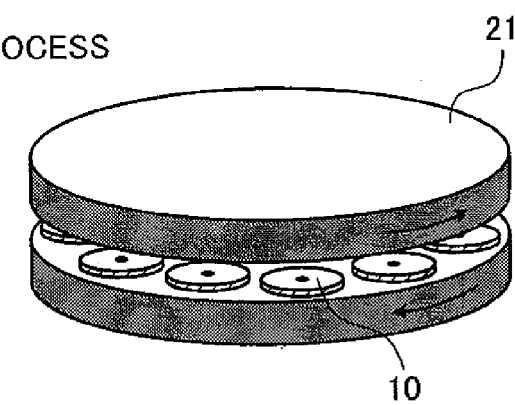
Figure 1H:
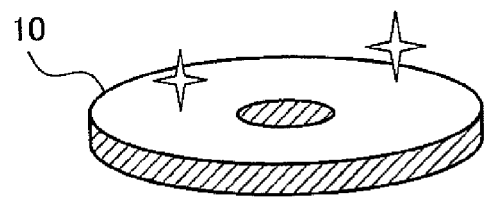

Next, in an inner circumference polishing process shown in FIG. 1E, a brush 60 is inserted into the portions having the opening hole at the center of the disk-shaped substrates 10, and the portions having the opening hole 12 of the disk-shaped substrates 10 are polished. Thereafter, in a first polishing process shown in FIG. 1F, the disk-shaped substrates 10 are mounted on the fixed base 21, and the flat surfaces 11 of the disk-shaped substrates 10 are polished. In the polishing process at this moment, for example, hard polisher is used as non-woven cloth (polishing cloth). Further, in the second polishing process shown in FIG. 1G, the flat surfaces 11 are polished by use of soft polisher. Thereafter, in a final washing and inspection process shown in FIG. 1H, washing and inspection are carried out, and thereby the disk-shaped substrates (disk substrates) 10 are manufactured.

Next, the inner circumference polishing process shown in FIG. 1E is further explained in detail.

Figure 2:
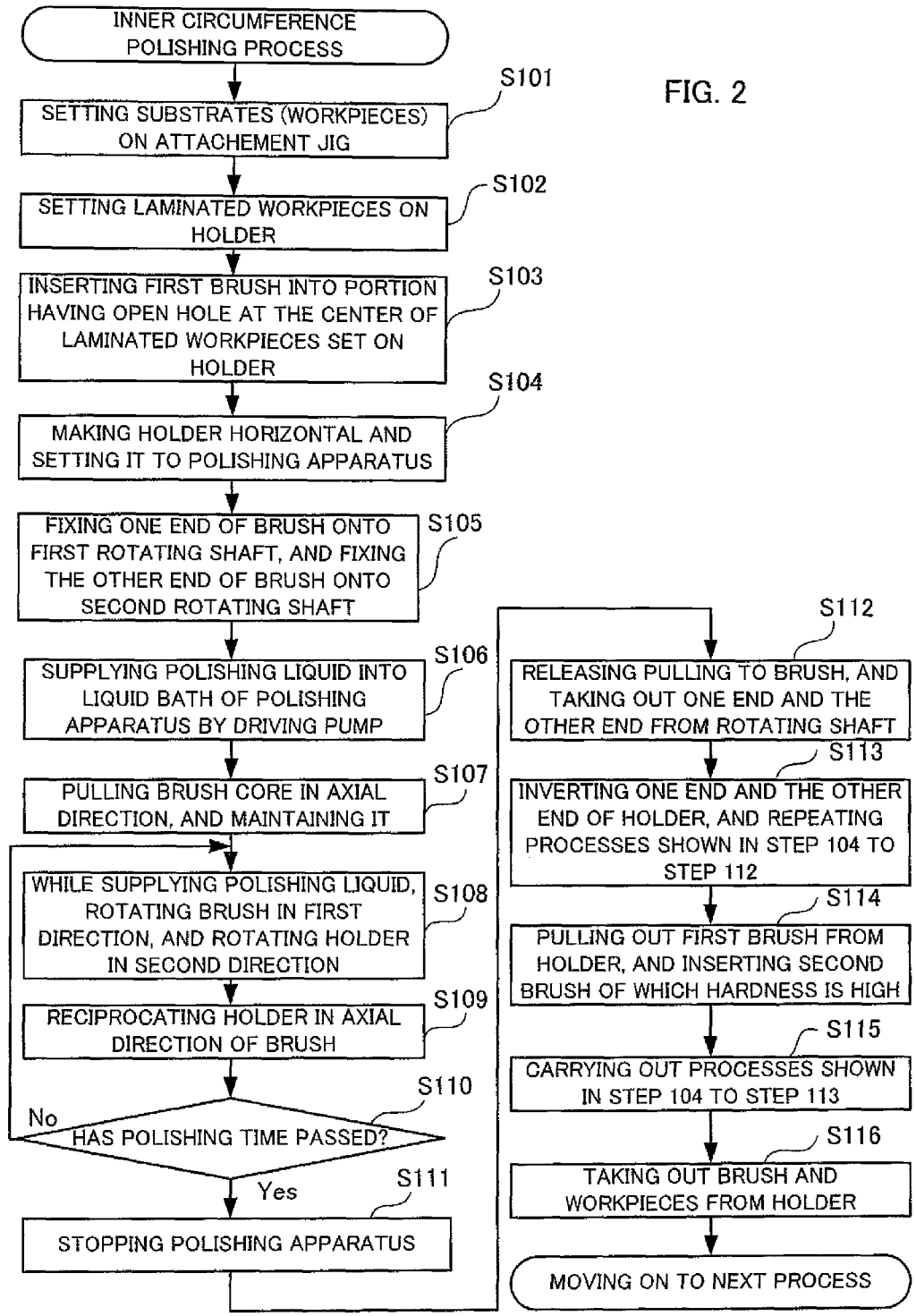
FIG. 2 is a flowchart illustrating the entire flow of the inner circumference polishing process.

FIG. 2 is a flowchart illustrating the entire flow of the inner circumference polishing process. Herein, first, the flow of the entire process is roughly explained. In the inner circumference polishing process, first, the disk-shaped substrates (workpieces) 10 are set on an attachment jig (step 101). Next, the disk-shaped substrates 10 (piled workpieces) piled on the attachment jig are set on a holder (step 102). Then, a first brush is inserted into the portions having the opening hole at the center of the piled workpieces set on the holder (step 103). This first brush is softer than a second brush to be described later, and is a brush with long bristles. It is used for preferably polishing chamfered portions formed on inner circumference of the disk-shaped substrate (the workpiece) 10. Meanwhile, in the first brush and the second brush, their bristle ends are arranged spirally, and the cores are flexible.

Next, the holder to which the piled workpieces are set and the first brush is inserted is made horizontal and set to a polishing apparatus (step 104). Then, one end of the brush protruding at the end of the holder is fixed onto the first rotating shaft of the polishing apparatus, and the other end of the brush is fixed onto the second rotating shaft of the polishing apparatus (step 105). Through the above work processes, the attachment of the workpieces to the polishing apparatus is completed.

After attachment of the workpiece, a pump is driven, and polishing liquid is supplied into a liquid bath of the polishing apparatus (step 106). In the area of the liquid bath of the polishing apparatus, the holder is set in its horizontal state, and in this state, almost half the holder is soaked in the polishing liquid. Further, around the operation for supplying the polishing liquid, the brush core is pulled in the axial direction by the polishing apparatus, and the pulled state is maintained (step 107).

In this state, while the polishing liquid is supplied, the brush is rotated in the first direction, and the holder is rotated in the second direction that is the reverse rotating direction to the first direction so as to perform polishing (step 108). Further, at this moment, the holder is reciprocated in the axial direction of the brush (step 109) By reciprocating the holder, the holder and the brush move relatively and the position at which the brush has contact with the workpieces is displaced, and thereby further even polishing is performed because uneven polishing due to polishing the same portion by the same brush is prevented. This polishing work is performed for a predetermined polishing time (step 110). That is, the controller of the polishing apparatus judges whether or not the predetermined time as the necessary time for polishing (polishing time) obtained from empirical rule has passed. Further, if the polishing time has not yet passed, the processes from the step 108 are repeated. Furthermore, when the polishing time passes, the polishing apparatus is stopped (step 111).

Thereafter, the polishing apparatus is operated to release the pulling to the brush, and one end and the other end of the brush are taken out from the rotating shaft (step 112). Then, after one end and the other end of the holder are inverted and the holder is put again on the polishing apparatus, the processes shown in the steps 104 to 112 are repeated (step 113). Thus, by inverting the holder and carrying out the same process, polishing conditions such as inversion of the rotation direction and the like are changed, and uneven polishing due to polishing conditions is restrained. After completion of polishing following this inversion, the first brush is pulled out from the holder, and the second brush of which hardness is higher than that of the first brush is inserted into the portion having the opening hole at the center of piled workpieces set to the holder (step 114). This second brush with high hardness is for polishing the inner circumferential surface of the disk-shaped substrate 10, and bristle length of the second brush is shorter than that of the first brush. Thereafter, in the processes shown in the steps 104 to 113, polishing process is performed in the same manner as the polishing process with the first brush (step 115). In the polishing by the second brush, according to the present exemplary embodiment, the portions having the opening hole at the center of disk-shaped substrates is polished in further more precisely than in the related art, even without carrying out polishing by inversion of the substrate holder shown at the step 113. However, in order to satisfy further severely required precision (surface roughness precision, dimensional precision, geometric precision and the like), it is more preferable to perform polishing by inversion (step 113) together as shown in the step 115. Meanwhile, in the case of using the first brush, and in the case of using the second brush, polishing conditions such as polishing time, rotation speed and the like in the step 110 may be changed. After completion of the polishing process, the brush and the workpieces are taken out from the holder (step 116), and the inner circumference polishing process ends and moves on to the next process.

Next, the inner circumference polishing process shown in respective steps in FIG. 2 is explained further in detail with reference to drawings.

Figure 3E:
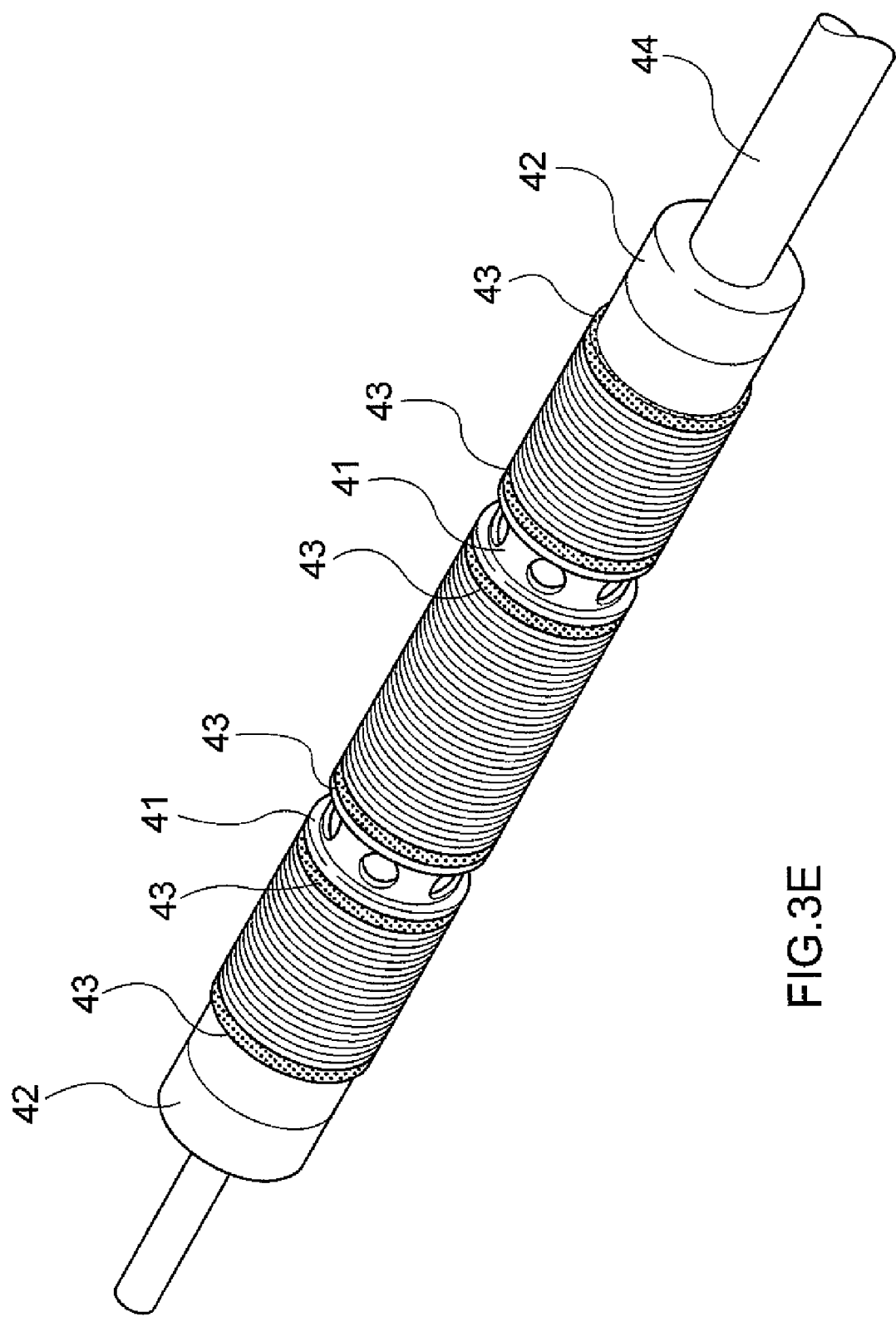
FIG. 3E is a diagram for explaining the attachment of the disk-shaped substrate to the jig shown in the step 101.

FIGS. 3A to 3E are diagrams for explaining the attachment of the disk-shaped substrate 10 to the jig shown in the step 101. FIG. 3A is a perspective view of the disk-shaped substrate 10 as a workpiece, and FIG. 3B is a partial cross sectional view of the portion having the opening hole at the center of the disk-shaped substrate 10. Further, FIG. 3C shows a polishing liquid guide spacer 41, and FIG. 3D shows a both-ends spacer 42. Furthermore, FIG. 3E shows a state where respective elements shown in FIGS. 3A to 3D are attached to a jig 44.

The disk-shaped substrate 10 as the object to be polished is, for example, a glass substrate of which diameter is approximately 21.66 mm, thickness is approximately 1 mm, and the diameter of the portion having the opening hole 12 at the center is approximately 6 mm, for generating a disk substrate of which diameter is 0.85 inches. The portion having the opening hole 12 of the disk-shaped substrate 10, as shown in FIG. 3B, has an inner circumferential surface 12a, and chamfered portions 12b where the edges of the inner circumferential surface 12a are ground. By providing these chamfered portions 12b, nonconformities such as crack and chipping are restrained in the follow-on processing process and assembly process and the like.

The polishing liquid guide spacer 41 shown in FIG. 3C has a function to supply polishing liquid (slurry) to the portion having the opening hole 12 at the center of the piled disk-shaped substrates 10 (the workpieces). In order to achieve such a function, as shown in FIG. 3C, the polishing liquid guide spacer 41 has end surfaces 41a, an axial direction surface 41b forming a surface having a smaller diameter than the outer diameter of the end surface 41a, and a portion having plural (for example, six) circulation supply holes 41c as a portion having penetrated holes formed on an axial direction surface 41b for supplying polishing liquid (slurry) to the portion having the opening hole 12 at the center of the piled workpieces. Further, at the center of the polishing liquid guide spacer 41, a portion having an opening hole 41d forming the inner circumference of the axial direction surface 41b is provided. The portion having the circulation supply holes 41c functions as an interconnection portion interconnecting the portion having the opening hole 41d and the axial direction surface 41b as the outer circumferential portion. The diameter of the inner circumference of the axial direction surface 41b (the diameter of the portion having the opening hole 41d) is larger than that of the inner circumference of the disk-shaped substrate 10. Further, as the raw material of the polishing liquid guide spacer 41, synthetic resin such as ABS (acrylonitrile butadiene styrene), POM (polyoxymethylene), Teflon(registered trademark), polyamide and the like is used.

The both-ends spacer 42 shown in FIG. 3D is provided, for example, for adjusting the number of piled sheets of the disk-shaped substrates 10, and for not arranging the disk-shaped substrate 10 at the end of brush where the polishing property may become unstable. This both-ends spacer 42 is formed of the same material as that of the polishing liquid guide spacer 41 (synthetic resin such as ABS, POM, Teflon (registered trademark), polyamide and the like) The outer diameter is slightly (for example, about 1 mm to 5 mm) smaller than the outer diameter of the disk-shaped substrate 10, and the inner diameter is configured so as to be the same as or more than the inner diameter of the disk-shaped substrate 10.

As shown in FIG. 3E, the disk-shaped substrates 10 shown in FIGS. 3A and 3B are piled so as to form the piled workpieces, and the members shown in FIGS. 3C and 3D, and a dummy substrates 43 are attached to the jig 44. To the jig 44, in total, for example, 150 sheets of the disk-shaped substrates 10 are piled, and between one end where the both-ends spacer 42 is arranged and the polishing liquid guide spacer 41, for example, 40 sheets of piled workpieces are attached, and between two polishing liquid guide spacers 41, for example, 70 sheets of piled workpieces are attached, and between the polishing liquid guide spacer 41 and the both-ends spacer 42 at the other end, for example, 40 sheets of piled workpieces are attached. By providing the dummy substrates 43 between respective spacers (polishing liquid guide spacers 41, both-ends spacers 42) and the disk-shaped substrates 10, the deterioration of the quality to the disk-shaped substrates 10 is restrained because the flat surfaces 11 of the disk-shaped substrate 10 do not have contact with the respective spacers. However, depending on raw materials of respective spacers, this dummy substrate 43 may not be used.

In addition, by piling the disk-shaped substrates 10 as shown in FIG. 3E, the space and the positions in the axial direction of the polishing liquid guide spacers 41 are determined.

Figure 4:
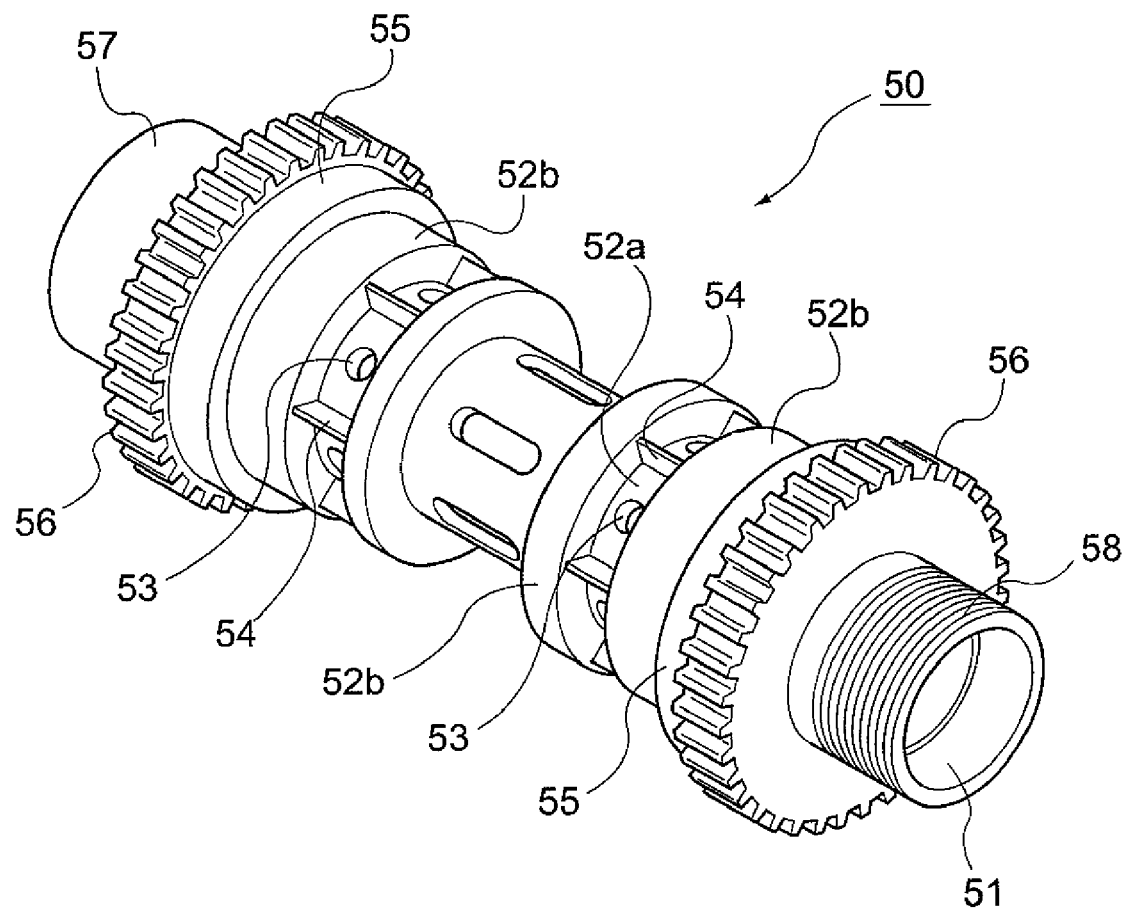
FIG. 4 is a diagram illustrating a substrate holder (a holder) for setting the piled workpieces shown in the step 102.

FIG. 4 is a diagram illustrating a substrate holder (a holder) 50 for setting the piled workpieces shown in the step 102. The substrate holder 50 is formed entirely of, for example, stainless steel, and has a portion having an attachment hole 51 as an aspect of an attachment portion for attaching the piled disk-shaped substrates 10 (piled workpieces) shown in FIG. 3E, and portions having a flow-in opening 53 that interconnect the outer circumference 52a of the substrate holder 50 with the portion having the attachment hole 51 and that let polishing liquid (slurry) flow in. Meanwhile, as the attachment portion, in place of the portion having the attachment hole 51, there also may be an aspect where, for example, the substrate holder 50 is configured so as to be separated into several parts (for example, two separate parts) in the axial direction, and after piled workpieces are attached, these several separated parts are assembled (fixed) to form the substrate holder 50 and thereby piled workpieces are attached and the like. Further, the substrate holder 50 has vanes 54 that are provided in the vicinity of the portions having the flow-in opening 53, that are provided on the surface of the outer circumference 52a, and that guides polishing liquid (slurry) to the portions having the flow-in opening 53. The portions having flow-in opening 53 and the vanes 54 are formed in two parts in the axial direction, and, for example, six portions having the flow-in opening 53 are provided at one part of the surface of the outer circumference 52a, and the vanes 54 are formed between respective portions having the flow-in opening 53.

The positions of the two parts in the axial direction where the portions having the flow-in opening 53 are formed are nearly the same as the axial positions of two polishing liquid guide spacers 41 set as shown in FIG. 3E when the piled workpieces shown in FIG. 3E are set to the substrate holder 50. Due to the structure formed by the dump formed between the outer circumference 52a and the outer circumference 52b of which diameter is larger than that of the outer circumference 52a, and by the vanes 54, polishing liquid (slurry) is agitated upward by the rotation of the substrate holder 50, and polishing liquid (slurry) is supplied to the portions having the flow-in opening 53.

Further, in the substrate holder 50, contact ring members 55 made of acetar resin such as, for example, Delrin (registered trademark of DuPont) are formed on the outer circumferences 52b at two positions (several positions) in the axial direction. Furthermore, gears 56 for rotating the substrate holder 50 are formed at two positions in the axial direction. Moreover, the substrate holder 50 has a nut 57 that presses piled workpieces in the axial direction after piled workpieces are inserted, and fixes the piled workpieces to the substrate holder 50. In FIG. 4, the nut 57 is shown in only one axial direction, however, after the piled workpieces are inserted, another nut 57 is provided in the other axial direction too. That is, after the piled workpieces are inserted into the portion having the attachment hole 51, by use of the screw portion 58 at other side, the nut 57 is fastened so as to fix the piled workpieces. In each of the nuts 57 attached to both the ends of the substrate holder 50, a portion having an opening hole (a portion having a nut opening hole 57a in FIG. 6 to be described later) is provided at the center in the axial direction, for pulling the jig 44 and inserting the brush 60, and for making polishing liquid (slurry) flow in at polishing. After fixation of the piled workpieces by the nut 57, the jig 44 shown in FIG. 3E is pulled out and removed from the piled workpieces. The contact ring member 55 has a role for positioning the entire substrate holder 50 when the substrate holder 50 is arranged to the polishing apparatus, for regulating the axis-to-axis distance between a drive side gear (described later) of the polishing apparatus and the gear 56, for coming in contact with flanges (described later) of the polishing apparatus and reciprocating the substrate holder 50 in the axial direction.

Figure 5:
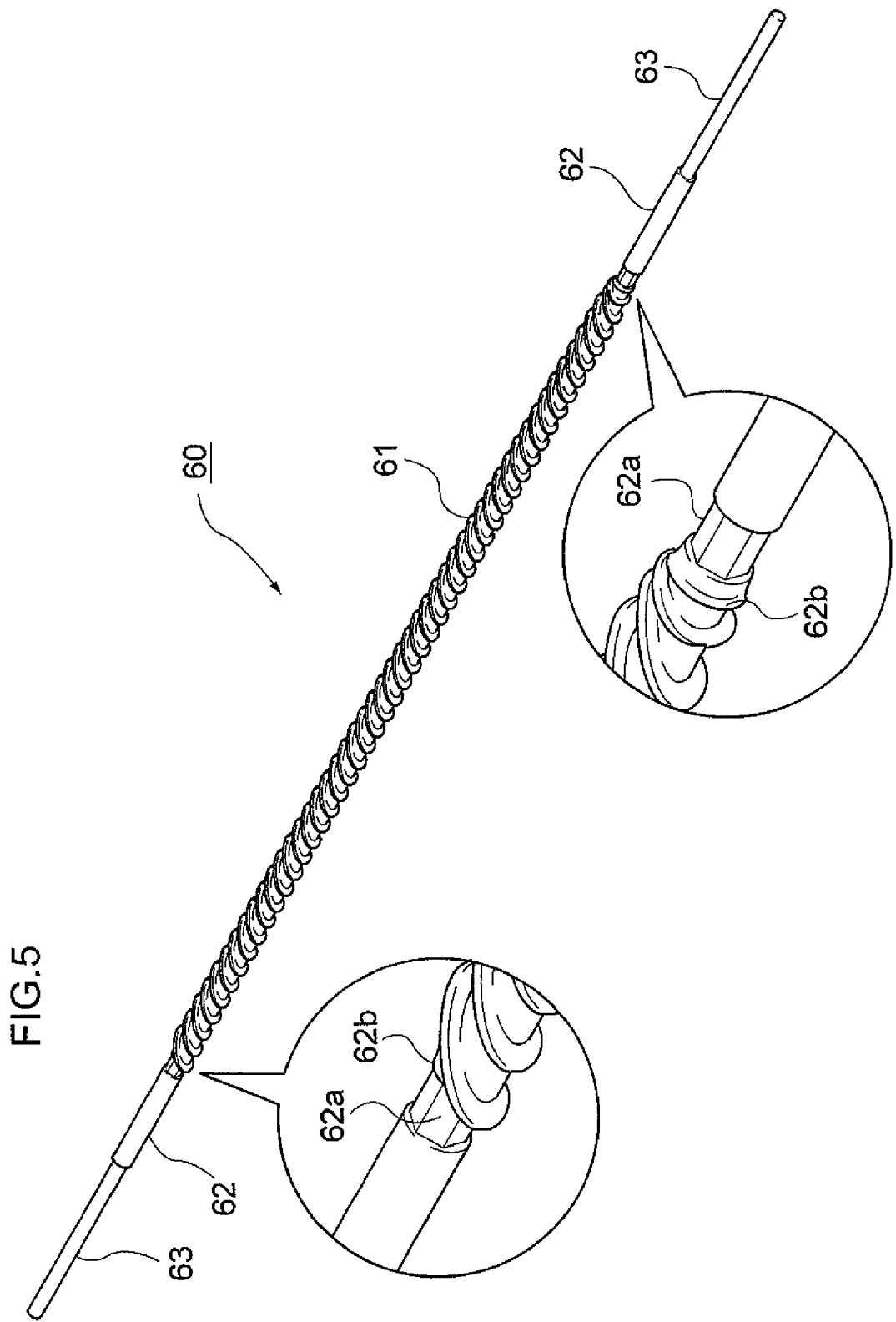
FIG. 5 is an external view illustrating a brush that is inserted into the portions having the opening hole at the center of the disk-shaped substrates set to the substrate holder, in the steps 103 and 114.

FIG. 5 is an external view illustrating a brush 60 that is inserted into the portions having the opening hole 12 at the center of the disk-shaped substrates 10 set to the substrate holder 50, in the steps 103 and 114. This brush 60 has a brush portion 61 of which bristles are formed to be arranged spirally, large diameter portions 62 that are formed continuously at both the ends of this brush portion 61, and a shaft 63 of which one end and the other end are formed continuously to the large diameter portions 62. The large diameter portion 62 includes a caulked portion 62a that combines the end of the brush portion 61 to the shaft 63, and a stop portion 62b that stops (prevents) the flow of polishing liquid (slurry) from the brush portion 61 to the end portion. That is, when the brush 60 rotates in a specified one direction while the substrate holder 50 is soaked in polishing liquid (slurry), by the brush portion 61 of which bristles are formed to be arranged spirally, polishing liquid (slurry) flows in one direction in the axial direction. At this moment, by the stop portion 62b of the large diameter portion 62, polishing liquid (slurry) is stopped, and the flow of the polishing liquid (slurry) to the end portion of the brush 60 is prevented.

As for the brush 60, it is necessary to make the core of the brush 60 thin, for polishing the inner diameter of a small diameter disk of, for example, 0.85 inches and the like, as the portion having the opening hole 12 at the center of the disk-shaped substrate 10. Therefore, in the present exemplary embodiment, for example, brush bristles (raw material: for example, Nylon (trade name of DuPont) are taken between plural wires (raw material: for example, soft steel wire (SWRM), hard steel wire (SWRH), stainless wire (SUSW), brass wire (BSW), and the like to be appropriately selected from viewpoints of processability, rigidity and the like), and the wires which bristles are taken between are twisted so that the brush portion 61 is formed. By forming the brush portion 61 by twisting the wires, the brush bristles are formed on the brush portion 61 spirally, and polishing liquid (slurry) flows in the axial direction at the portion having the opening hole 12 at the center of the inserted piled workpieces and thereby preferably transferred at this portion. Further, by providing the stop portion 62b at both the ends of the brush portion 61, the flow of the polishing liquid (slurry) to the end portions is restrained.

Further, in the brush 60 having such a structure, the core of the brush portion 61 of the brush 60 has flexibility. This "flexibility" indicates, in the present exemplary embodiment, flexibility having such a extent that a man holds both the ends and bends easily, and that a man touches and bends both the ends. For example, when the brush shaft of brush 60 formed by twisting four soft steel wires (SWRM) of which diameter was around 0.2 mm and which the brush bristles was taken between was held at both ends with free end support, and the central portion of the brush 60 was pressed with approximately 100 gf, deflection was observed. Meanwhile, this value varies with thickness, kinds, twisting method and the like of wire materials. As for the flexibility, for example, it may be configured to observe deflection when, for example, the brush shaft was held at both ends with free end support under pressing the central portion of the brush 60 with approximately 100 gf.

Meanwhile, in the present exemplary embodiment, as the brush 60, two kinds of brushes, a first brush and a second brush are prepared. The first brush to be inserted at the step 103 is a brush of which the bristles are soft and long, and the second brush to be inserted at the step 114 is a brush of which the bristles are harder and shorter than those of the first brush. By using the first brush with soft and long bristles, the chamfered portions 12b of the disk-shaped substrate 10 (refer to FIG. 3B) are preferably polished. On the other hand, by using the second brush with hard and short bristles, the inner circumferential surface 12a of the disk-shaped substrate 10 (refer to FIG. 3B) is preferably polished. Thus, by using plural brushes 60 with different bristle conditions, plural surfaces are preferably polished. Meanwhile, in disk substrates as products, the dimensional precision of the inner circumferential surface 12a is required more, and consequently, it is preferable to use the brush 60 which is preferable for polishing the inner circumferential surface 12a as the second brush in later process.

Figure 6:
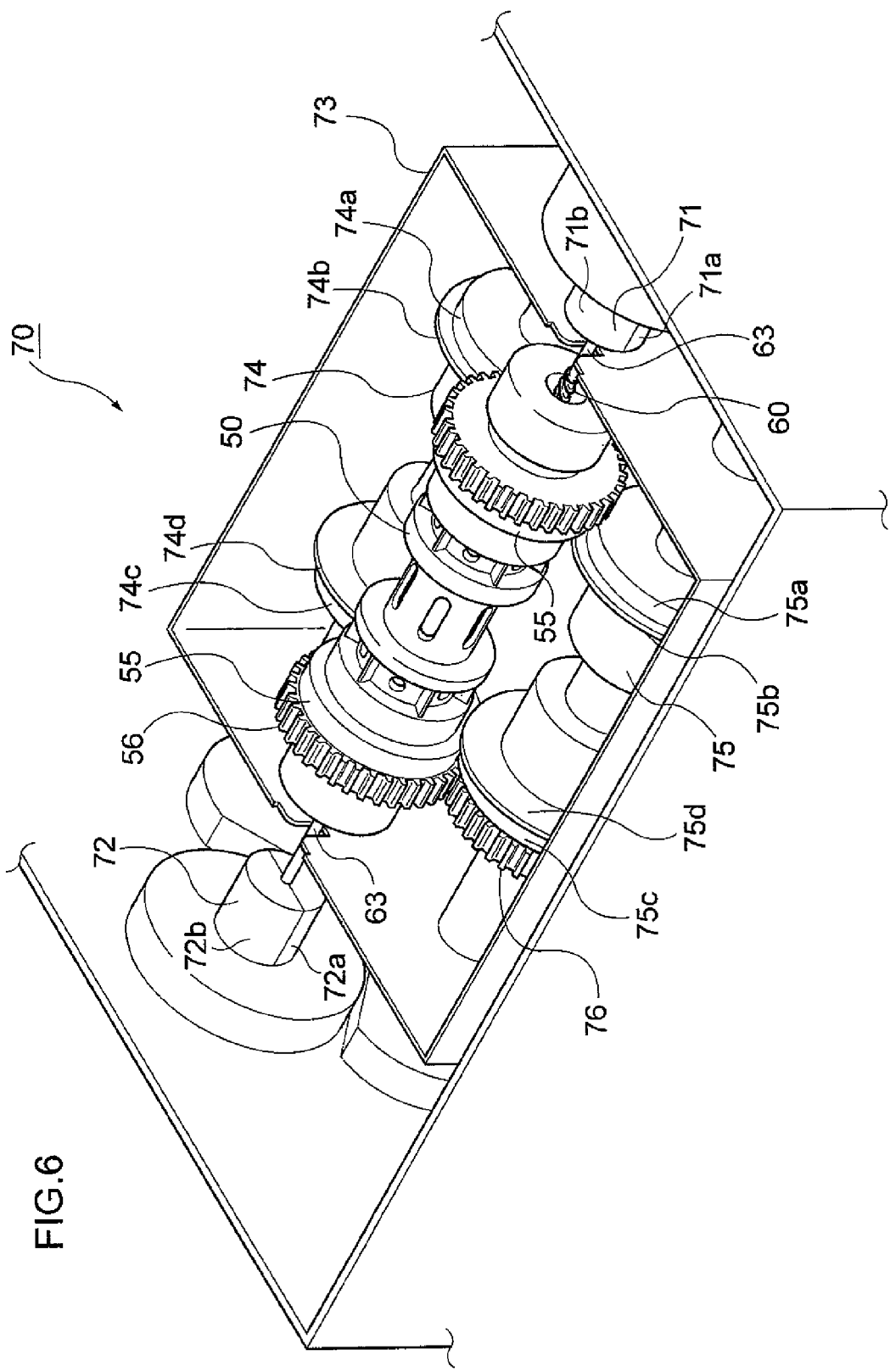
FIG. 6 is a perspective view illustrating a state where the substrate holder in which the disk-shaped substrates and the brush are set is set in the polishing apparatus taking the axial direction as the horizontal direction (nearly horizontal direction)
Figure 7:
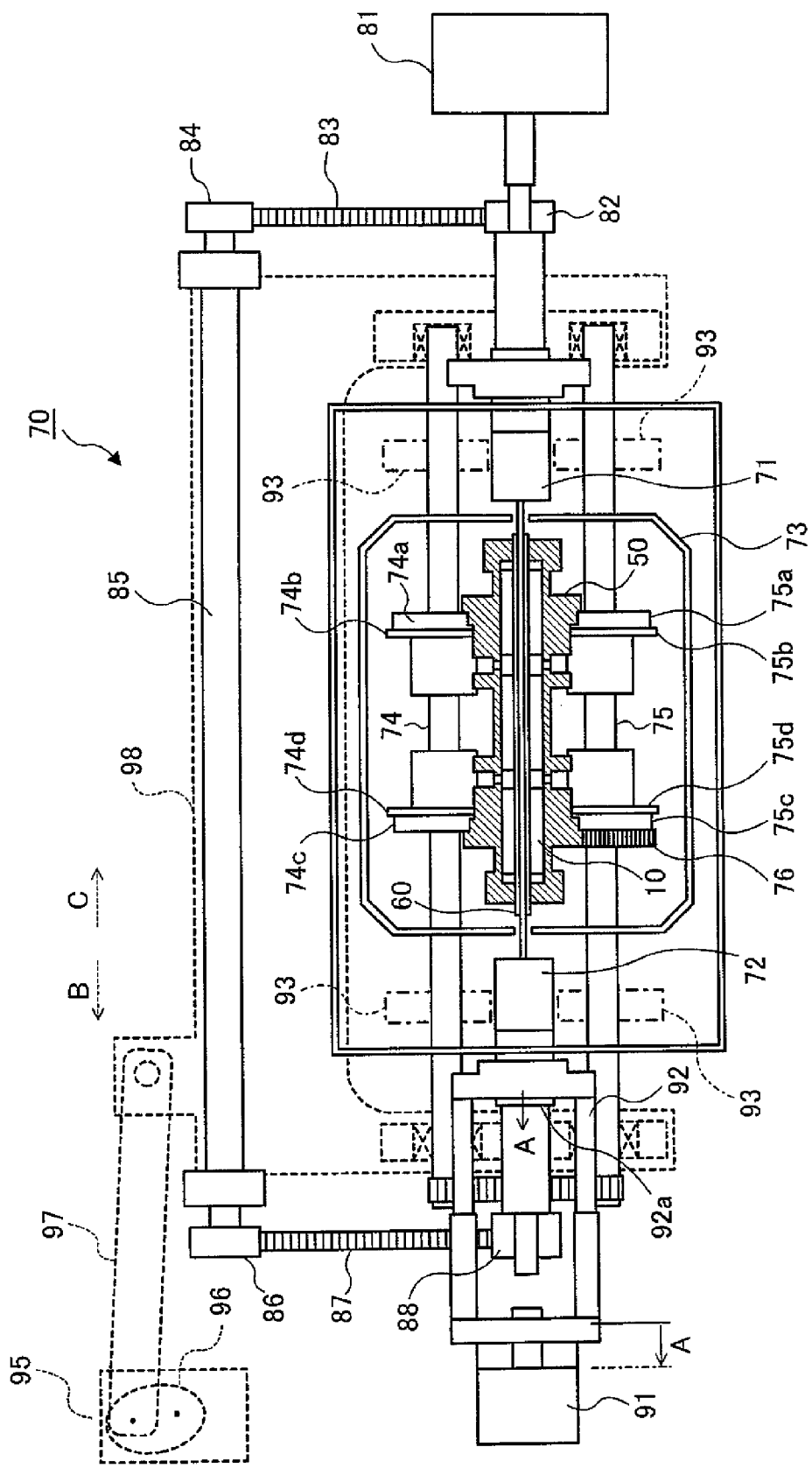
FIG. 7 is an explanatory diagram illustrating a drive system of the polishing apparatus.
Figure 8:
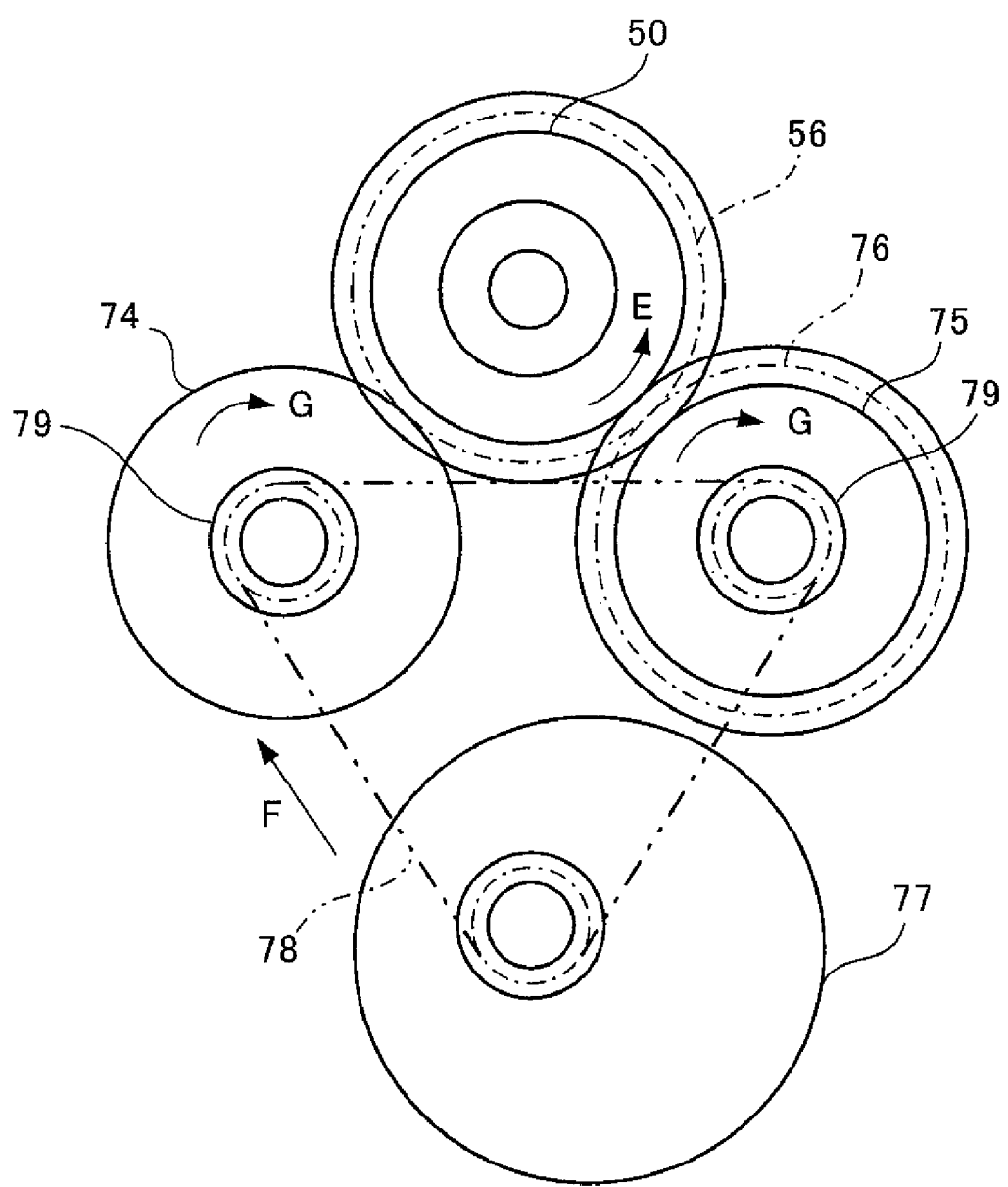
FIG. 8 is an explanatory diagram illustrating a drive system of the rotation of the substrate holder, and roughly shows the state viewed from a second rotating shaft side in the axial direction of the polishing apparatus shown in FIG. 6.

Next, with reference to FIGS. 6 to 8, a polishing apparatus 70 used in the steps 104 to 112 is explained.

FIG. 6 is a perspective view illustrating a state where the substrate holder 50 in which the disk-shaped substrates 10 and the brush 60 are set is set in the polishing apparatus 70 taking the axial direction as the horizontal direction (nearly horizontal direction). Further, FIG. 7 is an explanatory diagram illustrating a drive system of the polishing apparatus 70. Furthermore, FIG. 8 is an explanatory diagram illustrating a drive system of the rotation of the substrate holder 50, and roughly shows the state viewed from a second rotating shaft 72 side in the axial direction of the polishing apparatus 70 shown in FIG. 6.

As shown in FIGS. 6 and 7, the polishing apparatus 70 has a first rotating shaft 71 to which one end of the shaft 63 of the brush 60 is fixed, a second rotating shaft 72 to which the other end of the shaft 63 is fixed, and a liquid bath 73 that stores polishing liquid (slurry). Further, the polishing apparatus 70 has a first supporting shaft 74 and a second supporting shaft 75 that support the substrate holder 50. To the second supporting shaft 75, a drive side gear 76 that engages with the gear 56 of the substrate holder 50 and that rotates the substrate holder 50 is provided.

The first rotating shaft 71 and the second rotating shaft 72 are configured as integral members 71a and 72a that are integrated with the rotating shafts, and separated members 71b and 72b that are attached with stop screws (not shown in figures) and the like. Further, by combining these members on a flat surface including the central axis, individual first rotating shaft 71 and second rotating shaft 72 are formed. When the substrate holder 50 is set in the polishing apparatus 70 in the state where the separated members 71b and 72b are removed, both the ends of the shaft 63 of the brush 60 protruding from the portions having the nut opening hole 57a of the nuts 57 attached to the substrate holder 50 are placed in the central portions of the integral members 71a and 72a. Thereafter, the separated members 71b and 72b are attached to the integral members 71a and 72a with stop screws, so that one end of the shaft 63 is fixed to the first rotating shaft 71, and the other end is fixed to the second rotating shaft 72.

On the first supporting shaft 74 and the second supporting shaft 75, ring members 74a, 74c, 75a and 75c that are kept in contact with the contact ring members 55 of the substrate holder 50 and that support the substrate holder 50 are provided. While these four ring members 74a, 74c, 75a and 75c position the substrate holder 50 and support (hold) the substrate holder 50 in the horizontal direction, they are kept in contact with the contact ring members 55 and hold the position of the substrate holder 50 to the shaft 63 of the brush 60, within combination precision that does not affect polishing even when the first supporting shaft 74 and the second supporting shaft 75 rotate. Further, the ring members 74a, 74c, 75a and 75c come into contact with the contact ring members 55, and thereby keep the central distance between the gear 56 of the substrate holder 50 and the drive side gear 76 of the polishing apparatus 70 within a prescribed range, and keep the engagement preferably.

In more detail, the positioning of the substrate holder 50 in the radial direction is performed by making the contact ring members 55 are kept in contact with the ring members 74a, 74c, 75a and 75c of the two supporting shafts (74 and 75) by its own weight of the substrate holder 50 (including the piled disk-shaped substrates 10). Due to this own weight, it is designed that sufficient drag to any acting force in the direction for detaching from the drive side gear 76, such as component force in the direction for detachment by engagement of the gear 56 and the drive side gear 76, acting force in the direction for detachment by flow of polishing liquid (slurry), and further, acting force in the direction for detachment occurring at polishing by the brush 60 and the like, is obtained. By adopting such a structure, inverted attachment operation and attachment and detachment operation of the substrate holder 50 is carried out in a short time, and workability are made preferable.

On the other hand, in positioning of the substrate holder 50 in thrust direction, the side surfaces of the contact ring members 55 are positioned and regulated with a slight gap (space, clearance) by flange members 74b, 74d, 75b and 75d to be described later.

Meanwhile, as shown in FIG. 4, to the substrate holder 50, the gears 56 (first gear and second gear) are provided at two positions in the axial direction. Further, when the substrate holder 50 is inverted in the step 113 in FIG. 2, any one of the gears 56 is interconnected to the drive side gear 76 of the polishing apparatus 70. These first gear and second gear are provided at mutually symmetrical position to the axial direction of the substrate holder 50. In actual polishing process, the substrate holder 50 to which the disk-shaped substrates 10 are set and the brush 60 is inserted is set horizontally to the polishing apparatus 70, and the first gear (one of gears 56) of the substrate holder 50 is engaged with the drive side gear 76 of the polishing apparatus 70. Then, the steps 105 to 112 in FIG. 2 are carried out, and the drive side gear 76 is driven to rotate so as to polish the portion having the opening hole 12. Thereafter, in the step 113, one end and the other end in the axial direction of the substrate holder 50 are inverted and the second gear (the other of gears 56) is engaged with the drive side gear 76 of the polishing apparatus 70. Thereafter, the steps 105 to 112 in FIG. 2 are carried out once again, and drive side gear 76 is driven to rotate and the portion having the opening hole 12 is polished. Thereby, the rotation of the disk-shaped substrates 10 attached to the substrate holder 50 and the rotation of the brush 60 are inverted easily, and inner circumference polishing is performed in respective inverted states.

Next, as shown in FIG. 8, the polishing apparatus 70 is equipped with a holder drive motor 77 as a drive source, and a belt 78 and a pulley 79 that transmit the drive force of the holder drive motor 77 to the first supporting shaft 74 and the second supporting shaft 75. When the belt 78 rotates in F direction in FIG. 8 by the holder drive motor 77, the first supporting shaft 74 and the second supporting shaft 75 rotate in G direction in FIG. 8. By this rotation in G direction, the drive side gear 76 provided on the second supporting shaft 75 rotates in G direction too, and the gear 56 (the substrate holder 50 side) that engages with this drive side gear 76 rotates in E direction. Thereby, the substrate holder 50 rotates in E direction.

Meanwhile, when the substrate holder 50 is supported by the first supporting shaft 74 and the second supporting shaft 75, a triangle JKL is formed by the center J of the substrate holder 50, the center K of the first supporting shaft 74, and the center L of the second supporting shaft 75. The triangle JKL forms an isosceles triangle with a base KL sharing the horizontal axis (X axis) and a center J as the apex. The two contact ring members 55 and 55 are kept in contact with the ring members 74a, 74c, 75a and 75c so that the triangle JKL forms such an isosceles triangle. The triangle JKL forms the isosceles triangle with the base KL sharing the horizontal axis (X axis) and the center J as the apex, and thereby the load of the substrate holder 50 applies evenly to the first supporting shaft 74 and the second supporting shaft 75, and stable supporting is attained. However, supporting may be also attained when two central axes that make the apex of the triangle do not share the X axis, or in the positional relation where the triangle becomes an inequilateral triangle than an isosceles triangle. Even in the case of supporting in positional relation where the triangle becomes other triangle than such an isosceles triangle, it is important to assure that this positional relation should not be broken during processing.

Further, as shown in FIGS. 6 and 7, on the ring members 74a, 74c, 75a and 75c of the first supporting shaft 74 and the second supporting shaft 75, flange members 74b, 74d, 75b and 75d for reciprocating the substrate holder 50 are formed. The flange members 74b, 74d, 75b and 75d are flanges (flaps) of which the diameter is larger than that of the ring members 74a, 74c, 75a and 75c, and face the side surface of the contact ring members 55 that is kept in contact with the ring members 74a, 74c, 75a and 75c. The flange members 74b and 74d are arranged symmetrically in the axial direction of the first supporting shaft 74. Similarly, the flange members 75b and 75d are arranged symmetrically in the axial direction of the second supporting shaft 75. When the first supporting shaft 74 and the second supporting shaft 75 are reciprocated in the axial direction, the side surfaces of the flanges (flaps) of the flange members 74b, 74d, 75b and 75d press the contact ring members 55, thereby the substrate holder 50 is reciprocated. That is, when the first supporting shaft 74 and the second supporting shaft 75 move in B direction in FIG. 7, the flange members 74d and 75d press the contact ring member 55 at one side of the substrate holder 50, and the substrate holder 50 moves in B direction. On the other hand, when the first supporting shaft 74 and the second supporting shaft 75 move in C direction in FIG. 7, the flange members 74b and 75b press the contact ring member 55 at the other side of the substrate holder 50, and the substrate holder 50 moves in C direction. Thus, in the present exemplary embodiment, the shaft 63 of the brush 60 to which tension is applied is not reciprocated in the axial direction, the substrate holder 50 is reciprocated, and the piled disk-shaped substrates 10 (the piled workpieces) are reciprocated. Thereby, the relative movement of the brush 60 and the piled disk-shaped substrates 10 (the piled workpieces) in the axial direction is performed.

Further, as shown in FIG. 7, the polishing apparatus 70 is equipped with a brush motor 81 for rotating the brush 60. Furthermore, as interconnecting mechanisms for rotating one end and the other end of the shaft 63 of the brush 60 in synchronization by use of the rotation of the brush motor 81, it is equipped with a first pulley 82, a first belt 83 as a toothed belt, a second pulley 84, a rotating shaft 85, a third pulley 86, a second belt 87 as a toothed belt, and a fourth pulley 88. By these interconnecting mechanisms, the rotation of the brush motor 81 is mechanically interconnected to the first rotating shaft 71 and the second rotating shaft 72, and one end and the other end of the shaft 63 of the brush 60 rotate in synchronization. Meanwhile, in stead of adopting such mechanical interconnection, a structure in which motors are connected to the first rotating shaft 71 and the second rotating shaft 72 individually and one end and the other end are electrically synchronous may be adopted.

Furthermore, the polishing apparatus 70 is equipped with an air cylinder 91 that gives tension in the axial direction to the brush 60, and a pulling mechanism 92 that gives the tension of the air cylinder 91 to the second rotating shaft 72. By the tension of the air cylinder 91, the second rotating shaft 72 moves via the pulling mechanism 92 in A direction in FIG. 7. The air cylinder 91 maintains pulled state, and thereby the tension in the axial core direction to the brush 60 is maintained.

One example of this action is described below in detail. A ball spline 92a or the like that has properties, for example, torque transmission and direct rolling movement is provided in connection with the second rotating shaft 72. Further, the air cylinder 91 is operated, and then it is pulled in A direction by the pulling mechanism 92 so that the ball spline 92a is slid and the distance between the second rotating shaft 72 and the fourth pulley 88 is shortened. Furthermore, in this state, by drive force obtained from the brush motor 81 via the interconnecting mechanisms, the second rotating shaft 72 is rotated.

In the example of this action, even in the state where the second rotating shaft 72 is pulled by the air cylinder 91, the position of the fourth pulley 88 does not change, and drive force from the brush motor 81 is received.

Moreover, as an example of other action, there is a method where in the place of the ball spline 92a, a specified bearing or the like is used, and the distance between the second rotating shaft 72 and the fourth pulley 88 is not changed. That is, by a mechanism to slide the second rotating shaft 72 and the fourth pulley 88 as a unit in A direction by the tension of the air cylinder 91, the tension in the axial core direction to the brush 60 is maintained. In order to rotate the brush 60 from the second rotating shaft 72 after giving tension by adopting this mechanism, there may be some methods, such as, for example, a method where the axial length of the fourth pulley 88 is lengthened and slid between the second belt 87, a method where the fourth pulley 88 itself is slid, a method where, for example, the rotating shaft 85 arranged in the course of interconnecting mechanism of drive force is slid, and the like. By adopting these methods, even in the state where tension is given to the brush 60, the rotation of the brush motor 81 is transmitted to the fourth pulley 88 by use of the second belt 87.

Meanwhile, a structure may be adopted where pulling mechanism is provided in not any one of the first rotating shaft 71 or the second rotating shaft 72, but both the rotating shafts 71 and 72.

Further, the polishing apparatus 70 is equipped with stirring blades 93 on the first supporting shaft 74 and the second supporting shaft 75. By the rotation of the first supporting shaft 74 and the second supporting shaft 75, the stirring blades 93 are rotated, and thereby polishing liquid (slurry) is circulated at the bottom of the liquid bath 73.

Furthermore, the polishing apparatus 70 is equipped with a drive motor 95, an eccentric cam 96, a link 97, and a moving body 98, as mechanisms to reciprocate the first supporting shaft 74 and the second supporting shaft 75 in the axial direction shown by B direction and C direction in FIG. 7. By the rotation of the drive motor 95, the eccentric cam 96 rotates, and the link 97 interconnected with the eccentric cam 96 oscillates the moving body 98. Thereby, the first supporting shaft 74 and the second supporting shaft 75 interconnected with the moving body 98 reciprocate in B direction and C direction in FIG. 7. As mentioned previously, by the reciprocating movement of the first supporting shaft 74 and the second supporting shaft 75, the substrate holder 50 is reciprocated.

Thus, in the present exemplary embodiment, the relative reciprocating movement in the axial direction of the rotating brush 60 and the rotating disk-shaped substrates 10 is realized by moving the substrate holder 50. That is, to the B direction and the C direction shown in FIG. 7, the substrate holder 50 moves by the drive mechanisms (the driver motor 95, the eccentric cam 96, the link 97, the moving body 98 and the like). There may be considered a method where the brush 60 is reciprocated. However, as for the brush 60, both the ends of the shaft 63 are fixed, and tension is applied to the shaft 63, and further, both the shafts rotate in synchronization. Therefore, it is difficult to form a simple mechanism to reciprocate the brush 60 in particular in the state where both the ends are fixed and tension is kept constant. That is, in order to reciprocate the brush 60 in the state where both the ends are fixed and tension is kept constant, it is necessary to rotate the brush 60 by the brush motor 81 and to reciprocate all the structural members of the series of mechanisms to which tension is applied. Therefore, it is complicated and leads to increased costs. Further, since the shaft core of the brush 60 in the present exemplary embodiment is thin and highly flexible, it is not preferable to move the brush 60 in the axial direction during the brush 60 is rotating in order to stabilize the property of the brush 60. Therefore, in the present exemplary embodiment, the structure to reciprocate the substrate holder 50 is adopted.

Meanwhile, in the brush 60 shown in FIG. 5, the length of the brush portion 61 in the axial direction is determined in consideration of the relative reciprocating movement in the axial direction with the disk-shaped substrates 10. When the substrate holder 50, namely, the disk-shaped substrates 10 as the piled workpieces are reciprocated right and left, if the disk-shaped substrates 10 come out from the brush portion 61, polishing is not made preferably. Therefore, it is preferable to set the length of the brush portion 61 to the length with which the disk-shaped substrates 10 at the end of the piled workpieces should not come out from the brush portion 61 even when the piled disk-shaped substrates 10 are reciprocated right and left.

That is, when the length of the brush portion 61 in the axial direction is defined as L, and the length of the piled workpiece is defined as L0, and the distance of the reciprocating movement is defined as L1, there is a relation as shown below.

$$L > L0 + L1$$

Figure 9:
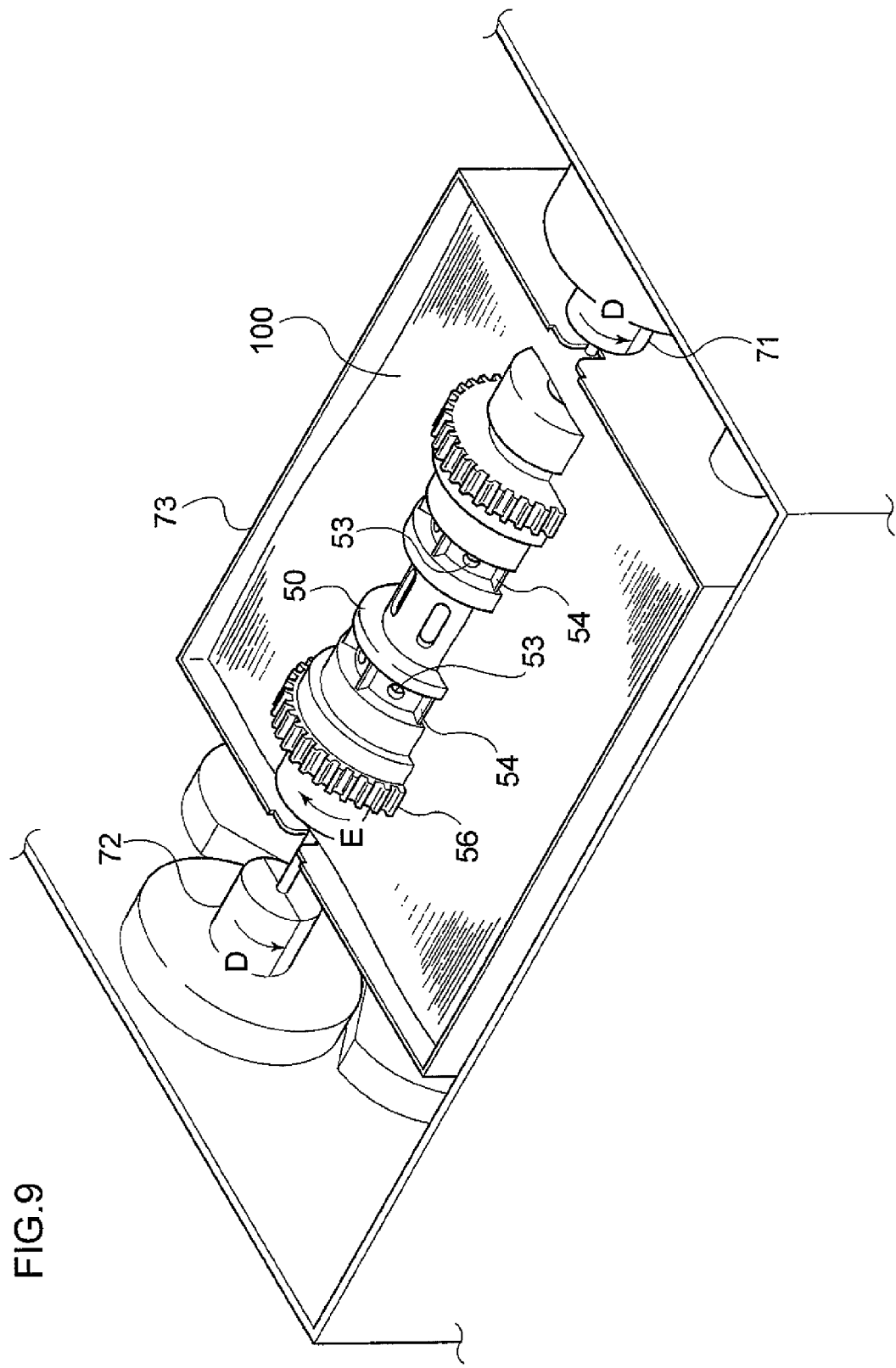
FIG. 9 is a perspective view for explaining the state where polishing liquid (slurry) is supplied to the liquid bath.

FIG. 9 is a perspective view for explaining the state where polishing liquid (slurry) 100 is supplied to the liquid bath 73. As shown in the step 106 in FIG. 2, a pump (not illustrated in figures) is driven, and the polishing liquid (slurry) 100 is supplied to the liquid bath 73 of the polishing apparatus 70. In the liquid bath 73, the polishing liquid (slurry) 100 is stored up to nearly the central portion of the horizontally set substrate holder 50. That is, not the whole but a part of the substrate holder 50 is soaked in the polishing liquid (slurry) 100.

In the present exemplary embodiment, the first rotating shaft 71 and the second rotating shaft 72 are outside of the liquid bath 73, and the various drive mechanisms such as the brush motor 81 (refer to FIG. 7), the interconnecting mechanisms and the like are separated from the liquid bath 73. As a result, the polishing liquid (slurry) 100 does not get into the various drive mechanisms, and the problem that mechanical parts such as bearing and the like are abraded by polishing agent included in the polishing liquid (slurry) 100 is addressed.

Herein, the state where "not the whole but a part of the substrate holder 50 is soaked in the polishing liquid (slurry) 100" indicates the state that the substrate holder is not completely soaked in the horizontal surface 100*a* of the polishing liquid (slurry) 100 stored in the liquid bath 73, but a part of the substrate holder 50 (the piled disk-shaped substrates 10) is above the horizontal surface 100*a*. Meanwhile, when actual polishing work is performed, by the rotation of the substrate holder 50, the entire substrate holder 50 (the piled disk-shaped substrates 10) is covered with the polishing liquid (slurry) 100. However, a part of the substrate holder 50 (the piled disk-shaped substrates 10) is still at the position (height) above the horizontal surface 100*a*.

Meanwhile, the position of the horizontal surface 100*a* is, normally, nearly the same as the height at which a notched portion 73*a* of the liquid bath 73 is formed, but the position (height) thereof slightly varies with the flow rate and viscosity of the polishing liquid (slurry) 100 to be supplied, and the size and shape of the notched portion 73*a*.

Figure 10A:
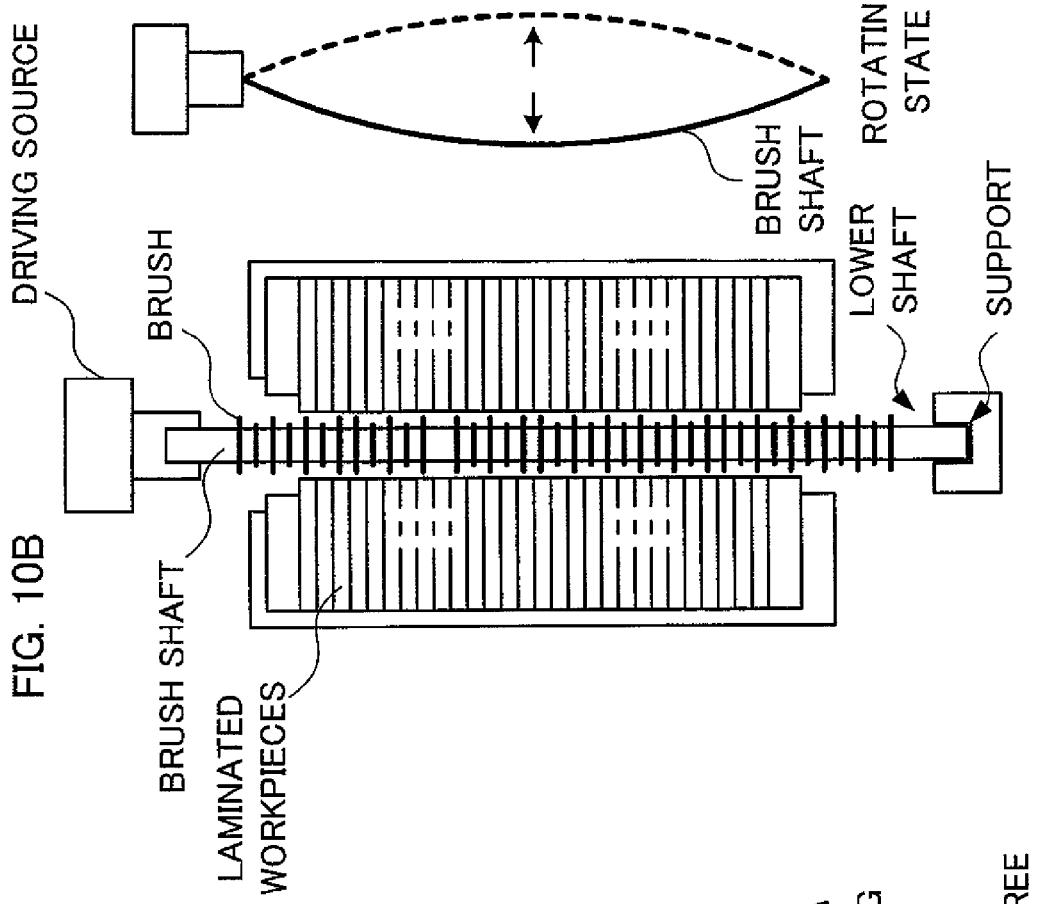
FIG. 10A is a diagram for explaining a method of polishing the inner circumference of disk-shaped substrates according to the related art.
Figure 10B:
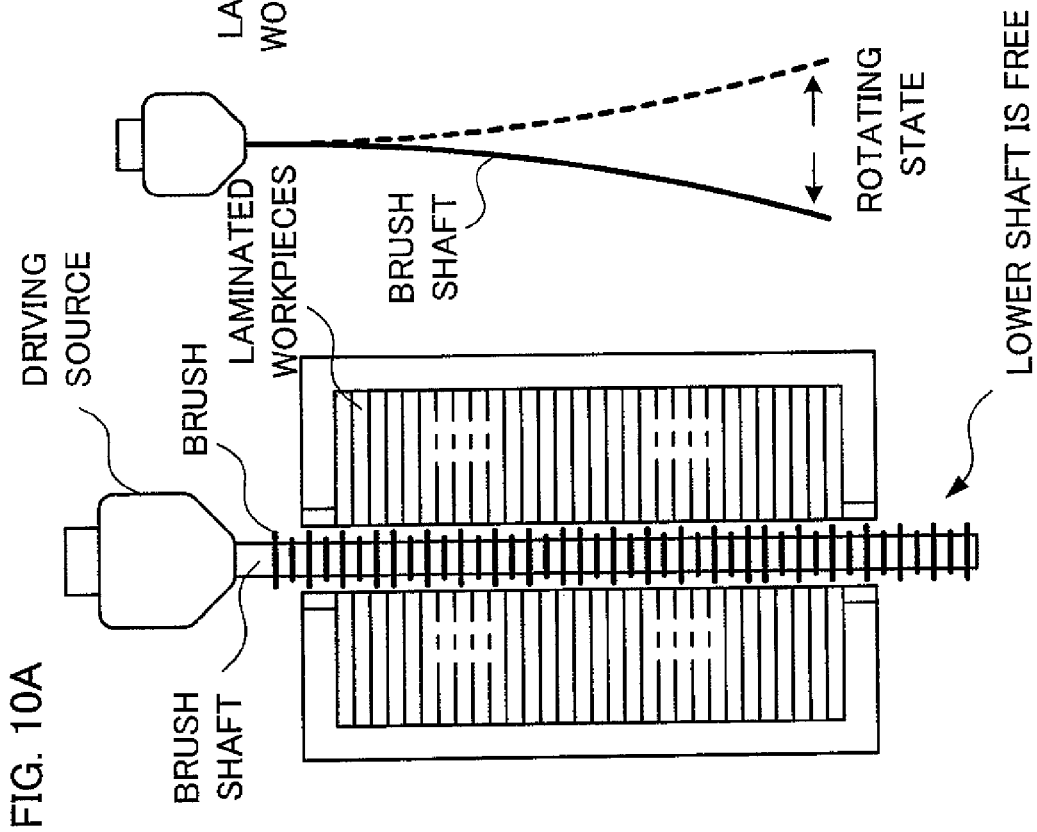
FIG. 10B is another diagram for explaining a method of polishing the inner circumference of disk-shaped substrates according to the related art.

Around the process in the step 106, as shown in the step 107, the air cylinder 91 (refer to FIG. 7) is operated, and tension is applied to the shaft 63 of the brush 60. This tension is preferably about 5 kgf to 50 kgf, more preferably about 10 kgf to 20 kgf. Meanwhile, 1 kgf is approximately 9.8N. In the present exemplary embodiment, both the ends of the shaft 63 of the brush 60 are supported and tension is applied, and thereby such an eccentric rotation as shown in FIGS. 10A and 10B is restrained. Therefore, the lower limit value of tension is the value experimentally determined so as to control the eccentric rotation, in consideration of rigidity of the brush, the rotation speed of the brush and the like. On the other hand, as described with reference to FIG. 5, the shaft core of the brush portion 61 of the brush 60 is formed by twisting wires. Therefore, the upper limit value of tension is determined as the value that does not elongate the shaft core of the brush portion 61 excessively, and does not disturb the property of bristles of the brush 60.

Thereafter, as the process in the step 108, in the state where the polishing liquid (slurry) 100 shown in FIG. 9 is supplied, both the ends of the brush 60 to which tension is applied are rotated in a first direction (D direction in FIG. 9) by use of the first rotating shaft 71 and the second rotating shaft 72. The rotation speed of the brush 60 is preferably, for example, about 1500 rpm to 2000 rpm. Simultaneously, the holder drive motor 77 shown in FIG. 8 is started, and the substrate holder 50 is rotated in a second direction (E direction in FIG. 9). As the rotation speed of the substrate holder 50, 20 rpm, 40 rpm, 60 rpm and the like are selected. At this moment, the drive motor 95 shown in FIG. 7 is operated, and as described at the step 109, the substrate holder 50 is reciprocated in the axial direction.

When the substrate holder 50 is rotated in the E direction in the state shown in FIG. 9, the polishing liquid (slurry) 100 is agitated up by the vane 54, and the polishing liquid (slurry) 100 flows via the portion having the flow-in openings 53 into the substrate holder 50. Then, the polishing liquid (slurry) 100 supplied from the portion having the flow-in openings 53 wraps around the polishing liquid guide spacers 41 shown in FIG. 3E inside of the substrate holder 50, and the portion between the axial direction surface 41*b* shown in FIG. 3C and the inner circumferential surface of the substrate holder 50 is filled with the polishing liquid (slurry) 100. Then, via the portion having the circulation supply holes 41*c* of the polishing liquid guide spacer 41, the polishing liquid (slurry) 100 is supplied to the portion having the opening hole 12 at the center of the piled disk-shaped substrates 10 (the piled workpieces). The polishing liquid (slurry) 100 supplied to the portion having the opening hole 12 at the center moves in the axial direction by the brush 60 of which the bristles are arranged spirally. By these actions, even when polishing is started from the state where not whole but a part of the substrate holder 50 is soaked in the polishing liquid (slurry) 100, the portion having the opening hole 12 at the center of the disk-shaped substrates 10 (the piled workpieces) is sufficiently filled with the polishing liquid (slurry) 100 in the axial direction.

Meanwhile, the polishing liquid (slurry) 100 also flows into the portion having the opening hole 12 at the center of the disk-shaped substrates 10 via the portion having the nut opening hole 57*a* of the nut 57 attached to the substrate holder 50. Then, the supplied polishing liquid (slurry) 100 moves in the axial direction by the brush 60 of which the bristles are arranged spirally. The polishing liquid (slurry) 100 that moves in the axial direction is discharged from the portion having the nut opening hole 57*a* of the nut 57 at the other end different from one end of the substrate holder 50 to which the polishing liquid (slurry) 100 flows, and returned to the liquid bath 73. Thus, the polishing liquid (slurry) 100 is made to flow via the end of the substrate holder 50 so as to perform polishing, and the polishing liquid (slurry) 100 is also circulated easily after polishing.

Herein, in the related art, when disk substrates are polished by a specified brush, polishing liquid is dropped to the inner circumferential surface as the surface to be polished, or the disk substrates and the brush are entirely soaked in a bath of polishing liquid. For example, in the case of adopting the structure shown in FIGS. 10A and 10B, when mechanisms to rotate a brush shaft and the like are provided in the lower shaft direction of the brush shaft, mechanical parts are soon corroded by polishing liquid, which has been a problem. Therefore, in the arrangement as shown in FIGS. 10A and 10B, it was difficult to support both the ends of the brush, in particular to drive to rotate both the ends.

In the present exemplary embodiment, the substrate holder 50 is held horizontally and a part of the disk-shaped substrates 10 (the piled workpieces) is soaked in the polishing liquid (slurry) 100. Further, in this state, the substrate holder 50 and the brush 60 are rotated, thereby the polishing liquid (slurry) 100 is supplied sufficiently to the portions having the opening hole 12 at the center of the piled disk-shaped substrates 10 (the piled workpieces). Furthermore, at this moment, in the present exemplary embodiment, the first rotating shaft 71 and the second rotating shaft 72, and the various drive mechanisms to drive these are arranged at positions kept away from the liquid bath 73 that stores the polishing liquid (slurry) 100. Thereby, the apparatus in the state where the various mechanical parts are not affected by the polishing liquid (slurry) 100 is operated, and, for example, abrasion of bearing and the like due to polishing liquid is prevented.

As described above, according to the present exemplary embodiment, the brush 60 is stably rotated from both the ends of the shaft 63 of the brush 60. Distortion is prevented by fixation of both the ends of the brush 60, in particular, the effect is significant when the portion having the opening hole 12 at the center of the disk-shaped substrates 10 is small, the brush 60 is thin, and the rigidity thereof is low. Further, by use of the brush 60 of which the bristles are arranged spirally, the flow of polishing liquid to the portion having the opening hole 12 at the center of the disk-shaped substrates 10 becomes preferable, while the problem due to distortion is liable to become conspicuous. However, according to the present exemplary embodiment, since both the ends of the shaft 63 of the brush 60 are fixed to the rotating shafts (the first rotating shaft 71 and the second rotating shaft 72), even in the case of using the brush 60 of which the bristles are arranged spirally, the portions having the opening hole 12 at the center of the disk-shaped substrates 10 are polished in an extremely precise manner.

Further, although in the portion having the opening hole 12 at the center of the disk-shaped substrate 10, there are the end surface (the inner circumferential surface 12a) and the chamfered portions 12b, in order to clear the conditions for the brush 60 to go into the chamfered portions 12b (portions of which distance from the central axis and the angle of the surface to come into contact with the brush 60 are different from those of the end surface), it is difficult with a single brush 60. In the present exemplary embodiment, the chamfered portions 12b are polished mainly by the first brush of which the bristles are long and have low rigidity, and the end surface (the inner circumferential surface 12a) is polished mainly by using the second brush of which the bristles are short and have high rigidity, and, by using these two brushes, the polishing work is optimized according to surface to be polished, and the portion having the opening hole at the center of the disk-shaped substrate 10 is precisely polished. At that moment, the chamfered portions 12b are polished mainly first, then the end surface (inner circumferential surface 12a) is polished mainly, and thereby the dimensional precision is made to be preferable after polishing of the end surface (the inner circumferential surface 12a) to which there are severe requirements.

Furthermore, according to the present exemplary embodiment, the brush 60 is stably rotated from both the ends of the shaft 63 to which tension is applied. Since the both the ends of the brush 60 are fixed and tension is applied to the brush 60, the swing of the shaft core is restrained, and in particular, the effect is significant when the portion having the opening hole 12 at the center of the disk-shaped substrate 10 is small, the brush 60 is thin, and the rigidity thereof is low.

Herein, like the brush 60 shown in FIG. 6, bristles are arranged spirally, thereby the flow of the polishing liquid to the portion having the opening hole 12 at the center of the disk-shaped substrate 10 becomes preferable, while the problem due to the distortion may become conspicuous. In particular, for example, when, by use of the brush 60 where plural wires are twisted to form the shaft core, only one side of the shaft 63 is driven and the other side of the shaft 63 is rotated without being fixed, the circumferential speed is not made constant because swing of the rotation occurs at the other side due to the distortion. As a result, the property of the brush 60 becomes unstable, and the polishing precision is deteriorated. However, according to the present exemplary embodiment, where both the ends of the shaft 63 of the brush 60 are fixed to the rotating shafts (the first rotating shaft 71 and the second rotating shaft 72), and tension is applied to the brush 60, thereby, even in the case when a specified processing is made on the shaft core, for example, the brush 60 of which wires are twisted to form the shaft core is used, the portion having the opening hole 12 is precisely polished at the center of the disk-shaped substrates 10.

Further, according to the present exemplary embodiment, setting for the rotation of the substrate holder 50 is just made by mounting contact ring members (55 and 55) of the substrate holder 50 on the plural ring members (74a, 74c, 75a and 75c) of the polishing apparatus so that the contact ring members (55 and 55) are kept in contact with the plural ring members (74a, 74c, 75a, 75c) of the polishing apparatus 70. Further, by only this work, the gear 56 of the substrate holder 50 is made to engage with the drive side gear 76 of the polishing apparatus 70. Furthermore, this engagement uses the own weight of the substrate holder 50 that is enough to obtain sufficient drag to the addition of various acting forces in the direction for detaching from the drive side gear 76, and thereby preferable engagement with a very simple structure is realized. Furthermore, two gears 56 (the first gear and the second gear) are provided at the symmetrical position to the axial direction of the substrate holder 50. Thereby, even when it is necessary to invert the substrate holder 50 and to make the polishing uniform to the axial direction of the piled workpieces, the substrate holder 50 is easily arranged. Furthermore, at that moment, centering and fixing are simple, and manufacturing costs are reduced significantly. In addition, in the state where the substrate holder 50 is set for rotation, both the ends of the shaft 63 of the brush 60 are fixed, further, tension is applied to the shaft 63, and thereby the swinging of the shaft core is restrained. In particular, the effect is significant when the portion having the opening hole 12 at the center of the disk-shaped substrate 10 is small, the brush 60 is thin, and the rigidity thereof is low.

Further, the portion having the flow-in openings 53 are provided in the substrate holder 50, and the polishing liquid guide spacers 41 are provided, thereby the polishing liquid (slurry) 100 is supplied by the rotation of the substrate holder 50, to the portion having the opening hole 12 at the center of the piled disk-shaped substrates 10 (piled workpieces). By adopting such a structure, stable inner circumference polishing is realized without forced supply to the portion having the opening hole 12 by a pump or the like.

Furthermore, according to the present exemplary embodiment, the substrate holder 50 is held horizontally and polishing is performed, and thereby polishing is performed uniformly to the axial direction of the piled disk-shaped substrates 10 (the piled workpieces). In addition, at this moment, both the ends of the shaft 63 of the brush 60 are fixed, further, tension is applied to the shaft 63, and thereby the swing of the shaft core is restrained. In particular, the effect is significant when the portion having the opening hole 12 at the center of the disk-shaped substrate 10 is small, the brush 60 is thin, and the rigidity thereof is low.

Herein, in the present exemplary embodiment, the substrate holder 50 is set horizontally, and the polishing liquid (slurry) 100 in which a part of the disk-shaped substrates 10 inserted into this substrate holder 50 is soaked is made to flow into the portion having the opening hole 12 at the center of the disk-shaped substrates 10 and polishing is carried out, and thereby preferable circulation supply of the polishing liquid (slurry) 100 is realized. Furthermore, the polishing liquid (slurry) 100 in which a part of the disk-shaped substrates 10 inserted into this substrate holder 50 is soaked is made to flow into the portion having the opening hole 12 at the center of the disk-shaped substrates 10 by rotating the brush 60, and thereby circulation supply of the polishing liquid (slurry) 100 is performed uniformly to the piled workpieces. Moreover, circulation supply of the polishing liquid (slurry) 100 is performed by making it flow into the end (the portion having the nut opening hole 57a of the nut 57) of the substrate holder 50 and the portions having the flow-in opening 53, and thereby, more even and simpler circulation supply of slurry is realized in comparison with the structure to supply slurry from one end of holder by a pump or the like.

Meanwhile, the present invention may be figured out as the following inventions.

A disk-shaped substrate polishing apparatus for polishing an inner circumference of a disk-shaped substrate including a portion having an opening hole at the center thereof, which includes a brush inserted into the portion having the opening hole of the disk-shaped substrates, which polishes the portion having the opening hole, a pair of rotating shafts on which fixing portions for fixing one end and the other end of the brush are provided coaxially at positions that are mutually detached, and a drive unit that rotates the rotating shafts, and rotates the brush fixed to the rotating shafts.

The disk-shaped substrate polishing apparatus described above, wherein the driving unit synchronously rotates the pair of rotating shafts by any one of a mechanical connection of the pair of rotating shafts with a single motor, and controlling individual motors provided to each pair of the rotating shafts.

The disk-shaped substrate polishing apparatus described above, wherein the pair of rotating shafts includes a first rotating shaft to which one end of the brush is fixed, and a second rotating shaft that is arranged to keep away from the first rotating shaft, to which the other end of the brush is fixed, and a biasing unit that moves at least any one of the first rotating shaft and the second rotating shaft in the axial direction and applies tension to the core of the brush in the axial direction of the core.

A disk-shaped substrate polishing apparatus for polishing an inner circumference of a disk-shaped substrate including a portion having an opening hole at the center thereof, which includes a substrate holder provided with a portion having an attachment hole to which the plural disk-shaped substrates are attached in the axial direction and a gear provided in an outer circumferential portion of the substrate holder, a brush that is inserted into the portion having the opening hole of the disk-shaped substrate and polishes the portion having the opening hole, a drive side gear that engages with a gear that is provided in the substrate holder, and a driving unit that rotates and drive the drive side gear.

The disk-shaped substrate polishing apparatus described above, wherein plural gears provided in the substrate holder are provided in the position to engage with the drive side gear even when the substrate holder is used inversely in the axial direction, and are provided at nearly symmetrical positions to the axial direction of the substrate holder.

The disk-shaped substrate polishing apparatus described above, wherein the substrate holder further includes a contact ring members provided on the outer circumferential portion of the substrate holder, and the contact ring members are kept in contact with ring members attached to a rotating shaft provided with the drive side gear so as to determine the engaging relation between the gear and the drive side gear applying driving force to the gear.

The disk-shaped substrate polishing apparatus described above, wherein the plural contact ring members are provided in the axial direction of the substrate holder, and the plural ring members are provided in correspondence to each of the contact ring members, and each of the contact ring members are supported by the plural ring members so as to hold the substrate holder in the horizontal direction, and further includes flanges that are provided in the ring members or the contact ring members and make the substrate holder reciprocate in the axial direction.

A disk-shaped substrate polishing apparatus for polishing an inner circumference of a disk-shaped substrate including a portion having an opening hole at the center thereof, which includes a liquid bath to which polishing liquid is supplied, a brush inserted into the portion having the opening hole of the disk-shaped substrates, which polishes the portion having the opening hole, a pair of rotating shafts that are provided outside of the liquid bath, and includes fixing portions to which one end and the other end of the brush are fixed, provided coaxially and horizontally at positions that are mutually detached, and a drive unit that rotates the rotating shafts in the state where a part of the disk-shaped substrates to which the brush is inserted is soaked in polishing liquid stored in the liquid bath.

The disk-shaped substrate polishing apparatus described above, wherein the brush of which bristles are formed spirally, and includes a restraining unit to restrain a flow of polishing liquid to the rotating shafts.

The disk-shaped substrate polishing apparatus described above, further includes a substrate holder that attaches plural disk-shaped substrates along the axial direction, a holding unit that holds the axial direction of the substrate holder in the horizontal direction, and a substrate holder rotating unit that rotates the substrate holder held by the holding unit in the reverse direction to the rotation direction by the drive unit.

The disk-shaped substrate polishing apparatus described above, wherein the substrate holder attaches guide spacers that are equipped with a portion having an opening hole at the center and an interconnecting portion which interconnects the portion having the opening hole and the outer circumferential portion, sandwiched between the piled disk-shaped substrates, and makes polishing liquid flow via the interconnecting portion and the portion having the opening hole of the guide spacer into the portion having the opening hole of the disk-shaped substrates.

A substrate holder used for inner circumference polishing of a disk-shaped substrate including a portion having an opening hole at the center thereof, which includes a portion having an attachment hole to which plural disk-shaped substrates are attached, a vane that is provided in the vicinity of the portion having the opening hole and on a surface of a outer circumference, and guides polishing liquid to the portion having the opening hole, and gears that are provided in an outer circumferential portion so as to rotate the disk-shaped substrates individually to a brush inserted into the portion having the opening hole of the disk-shaped substrates that polishes the portion having the opening hole.

The substrate holder described above, further includes contact ring members that are provided on the outer circumferential portion of the substrate holder, and that determines the engaging relation between the gear and a drive side gear applying driving force to the gear.

A polishing brush used for polishing a portion having an opening hole at the center of a disk-shaped substrate includes a brush portion of which bristles are arranged spirally, large diameter portions that are formed continuously at both ends of the brush portion, and a shaft of which one end and the other end are formed continuously to the large diameter portions and are formed to be fixed on each of rotating shafts.

The polishing brush described above, wherein the large diameter portion includes a caulked portion that combines the end of the brush portion to the shaft, and a stop portion that restrains a flow of polishing liquid from the brush portion to an end portion when the shaft is used in the state of the horizontal support.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A disk-shaped substrate inner circumference polishing method for polishing an inner circumference of a disk-shaped substrate including a portion having an opening hole at the center thereof, comprising:
   inserting a brush having a shaft core into the portion having the opening hole of the disk-shaped substrate, wherein the shaft core of the brush is formed by twisting wires;
   fixing one end of the brush to a first rotating shaft and the other end of the brush to a second rotating shaft, with each shaft being provided at a mutually detached position and pulling at least any one of the one end and the other end of the brush and applying tension in an axial direction to the shaft core of the brush, and wherein both shafts are positively driven;
   synchronously rotating the rotating shafts by positively driving the rotating shafts by a mechanical connection of the rotating shafts with a single motor, or by controlling individual motors provided to each rotating shaft;
   rotating the brush and polishing the inner circumference of the disk-shaped substrate;
   pulling the brush out from the disk-shaped substrate;
   inserting a second brush of which bristles are shorter and harder than the bristles of the brush into the portion having the opening hole of the disk-shaped substrate;
   fixing one end of the second brush to one of the rotating shafts and the other end of the second brush to the other rotating shaft, pulling at least any one of the one end and the other end of the second brush, and applying tension in the axial direction to a shaft core of the second brush; and
   rotating at least any one of the second brush and the disk-shaped substrate, and polishing the inner circumference of the disk-shaped substrate.

2. The disk-shaped substrate inner circumference polishing method according to claim 1, wherein
   the brush inserted into the portion having the opening hole has bristles that are arranged spirally, and
   the shaft core of the brush has flexibility.

3. The disk-shaped substrate inner circumference polishing method according to claim 1, wherein the shaft core of the second brush is formed by twisting wires.

4. The disk-shaped substrate inner circumference polishing method according to claim 1, comprising:
   attaching a plurality of the disk-shaped substrates to a substrate holder to which the plurality of the disk-shaped substrates are attached in the axial direction;
   inserting the brush into the portions having the opening hole of the disk-shaped substrates attached to the substrate holder;
   fixing one end of the brush to one of the rotating shafts and the other end of the brush to the other rotating shaft, with each shaft being provided at a mutually detached position in a horizontal direction, and
   soaking by submerging in a liquid a part of the disk-shaped substrates attached to the substrate holder into polishing liquid and polishing the inner circumference of the disk-shaped substrates.

5. The disk-shaped substrate inner circumference polishing method according to claim 4, wherein the rotating shafts to which the brush is fixed are provided in a position away from a liquid bath for soaking the part of the substrate holder into a polishing liquid.

6. The disk-shaped substrate inner circumference polishing method according to claim 1, comprising:
   attaching a plurality of the disk-shaped substrates to a substrate holder to which the plurality of the disk-shaped substrates are attached in an axial direction;
   holding the substrate holder in a horizontal state;
   soaking a part of the disk-shaped substrates in polishing liquid; and
   polishing the inner circumference of the disk-shaped substrates.

* * * * *